US010829664B2

(12) United States Patent
Martin et al.

(10) Patent No.: US 10,829,664 B2
(45) Date of Patent: *Nov. 10, 2020

(54) COATING COMPOSITIONS CONTAINING POLYTHIOETHERS AND ELASTIC BARRIER COATINGS FORMED THEREFROM

(71) Applicant: PPG Industries Ohio, Inc., Cleveland, OH (US)

(72) Inventors: Roxalana Lee Martin, Pittsburgh, PA (US); Aneta Bogdanova Iossifova, Allison Park, PA (US); Jennifer Tamaki Jordan, Natrona Heights, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 14 days.

This patent is subject to a terminal disclaimer.

(21) Appl. No.: 16/354,468

(22) Filed: Mar. 15, 2019

(65) Prior Publication Data

US 2020/0291263 A1 Sep. 17, 2020

(51) Int. Cl.
| | | |
|---|---|---|
| C08L 33/10 | (2006.01) |
| C09D 175/12 | (2006.01) |
| C09D 5/00 | (2006.01) |
| C09D 135/02 | (2006.01) |
| C09D 7/65 | (2018.01) |
| B29C 73/02 | (2006.01) |

(52) U.S. Cl.
CPC ............. *C09D 175/12* (2013.01); *C09D 5/00* (2013.01); *C09D 7/65* (2018.01); *C09D 135/02* (2013.01); *B29C 73/025* (2013.01)

(58) Field of Classification Search
CPC ...... C09D 109/06; C09D 7/65; C09D 139/08; C09D 163/00; C09D 193/00; C09D 187/005; C09D 7/1233; C08K 5/28; C08K 5/29; C08L 33/10; C08L 57/00; C08L 63/00; C08L 81/02; C08L 67/00; B60C 5/14
USPC ........................................................ 523/201
See application file for complete search history.

(56) References Cited

U.S. PATENT DOCUMENTS

| | | | |
|---|---|---|---|
| 3,279,936 A | 10/1966 | Forestek |
| 4,598,121 A | 7/1986 | Disteldorf et al. |
| 4,650,718 A | 3/1987 | Simpson et al. |
| 4,704,176 A | 11/1987 | Botzman |
| 4,888,383 A | 12/1989 | Huybrechts |
| 4,933,056 A | 6/1990 | Corrigan et al. |
| 4,983,662 A | 1/1991 | Overbeek et al. |
| 5,147,926 A | 9/1992 | Meichsner et al. |
| 5,348,997 A | 9/1994 | Kato et al. |
| 5,472,996 A | 12/1995 | Hayashi et al. |
| 5,530,043 A | 6/1996 | Zawacky et al. |
| 5,534,569 A | 7/1996 | Etoh |
| 5,571,861 A | 11/1996 | Klein et al. |
| 5,614,582 A | 3/1997 | Hori et al. |
| 5,656,701 A | 8/1997 | Miyamoto et al. |
| 5,660,890 A | 8/1997 | Rudy et al. |
| 5,705,549 A | 1/1998 | Hojo |
| 5,709,918 A | 1/1998 | Kimijima et al. |
| 5,760,107 A | 6/1998 | Valko et al. |
| 5,814,410 A | 9/1998 | Singer et al. |
| 5,820,987 A | 10/1998 | Kaufman et al. |
| 5,891,981 A | 4/1999 | Mauer et al. |
| 5,912,293 A | 6/1999 | Stockwell et al. |
| 5,912,319 A | 6/1999 | Zook et al. |
| 6,063,861 A | 5/2000 | Irle et al. |
| 6,203,913 B1 | 3/2001 | Kondos et al. |
| 6,239,209 B1 | 5/2001 | Yang et al. |
| 6,277,905 B1 | 8/2001 | Keep |
| 6,309,494 B1 | 10/2001 | Koch et al. |
| 6,455,631 B1 | 9/2002 | Blum et al. |
| 6,555,625 B1 | 4/2003 | Overbeek et al. |
| 6,579,932 B1 | 6/2003 | Schipper et al. |
| 6,635,706 B1 | 10/2003 | Petschke et al. |
| 6,706,818 B2 | 3/2004 | Ishihara et al. |
| 6,762,240 B2 | 7/2004 | Swarup et al. |

(Continued)

FOREIGN PATENT DOCUMENTS

| | | |
|---|---|---|
| CA | 2186776 A1 | 3/1998 |
| CA | 2219835 A1 | 5/1998 |

(Continued)

OTHER PUBLICATIONS

Boguslavskaya et al., "Effect of rubber functional groups on the intensity of rubber-filler interfacial interactions", Kauchuk i Rezina, 1988, pp. 14-17, vol. 11, [English-language abstract included].

Ezrielev et al., "Synthesis and chemical modification of rubber latexes containing ketonic groups", Kauchuk i Rezina, 1973, pp. 7-10, vol. 32:8, [English-language abstract included].

Hirose et al., "The structure and properties of core-shell type acrylic-polyurethane hybrid aqueous emulsions", Progress in Organic Coatings, 1997, pp. 157-169, vol. 31.

(Continued)

*Primary Examiner* — Hannah J Pak

(74) *Attorney, Agent, or Firm* — Julie W. Meder

(57) ABSTRACT

A coating composition that includes: (a) core-shell particles having a polymeric core at least partially encapsulated by a polymeric shell; (b) a polythioether having thioether linkages and mercapto functional groups; and (c) an adhesion promoter having at least one polymer that is different from (a) and (b). The polymeric shell of (a) includes: (i) a barrier segment including aromatic groups; and urethane linkages, urea linkages, or a combination thereof; and (ii) an elastomeric segment that is different from (i), in which the polymeric shell is covalently bonded to at least a portion of the polymeric core.

17 Claims, No Drawings

(56) References Cited

U.S. PATENT DOCUMENTS

| | | | |
|---|---|---|---|
| 6,765,056 B2 | 7/2004 | Hobel et al. | |
| 6,774,172 B1 * | 8/2004 | Nakamura | B60C 1/00 524/507 |
| 7,476,705 B2 | 1/2009 | Pajerski | |
| 7,531,074 B2 | 5/2009 | Purdy et al. | |
| 7,576,157 B2 | 8/2009 | Pajerski | |
| 8,283,405 B2 | 10/2012 | Yukawa | |
| 8,436,084 B2 | 5/2013 | Kawaguchi et al. | |
| 8,461,253 B2 | 6/2013 | Ambrose et al. | |
| 8,716,402 B2 | 5/2014 | Temple et al. | |
| 8,846,156 B2 | 9/2014 | Swarup et al. | |
| 8,900,667 B2 | 12/2014 | Boggs et al. | |
| 8,901,244 B2 | 12/2014 | Pajerski | |
| 9,102,783 B2 | 8/2015 | Yagi et al. | |
| 9,127,125 B2 | 9/2015 | Hartig et al. | |
| 9,149,835 B2 | 10/2015 | Swarup et al. | |
| 9,303,181 B2 | 4/2016 | Zhang et al. | |
| 9,365,731 B2 | 6/2016 | Jhaveri et al. | |
| 9,365,739 B2 | 6/2016 | Dombrowski et al. | |
| 2001/0024693 A1 | 9/2001 | Morimoto et al. | |
| 2002/0157761 A1 | 10/2002 | Bender et al. | |
| 2004/0068036 A1 | 4/2004 | Halladay et al. | |
| 2004/0096590 A1 | 5/2004 | Sasaki et al. | |
| 2005/0197480 A1 | 9/2005 | Temple et al. | |
| 2006/0121204 A1 | 6/2006 | Nakae et al. | |
| 2006/0148980 A1 | 7/2006 | Tielemans et al. | |
| 2006/0231589 A1 | 10/2006 | Wakamori | |
| 2006/0235244 A1 | 10/2006 | Wakamori | |
| 2007/0276068 A1 | 11/2007 | Hintzer et al. | |
| 2008/0021153 A1 | 1/2008 | Jeon et al. | |
| 2009/0117396 A1 | 5/2009 | Furusawa et al. | |
| 2010/0092766 A1 | 4/2010 | Stine et al. | |
| 2011/0070374 A1 | 3/2011 | Ambrose et al. | |
| 2011/0300389 A1 | 12/2011 | Kitagawa et al. | |
| 2012/0021228 A1 | 1/2012 | Kitagawa et al. | |
| 2012/0041113 A1 | 2/2012 | Ikeda et al. | |
| 2013/0078385 A1 | 3/2013 | Hendricks, Sr. | |
| 2013/0289165 A1 | 10/2013 | De Landtsheer et al. | |
| 2014/0020809 A1 | 1/2014 | Yokokura et al. | |
| 2014/0041578 A1 | 2/2014 | Hendricks, Sr. | |
| 2014/0242280 A1 | 8/2014 | Swarup et al. | |
| 2014/0272419 A1 | 9/2014 | Furar et al. | |
| 2014/0377468 A1 | 12/2014 | Swarup et al. | |
| 2015/0045491 A1 | 2/2015 | Zhang et al. | |
| 2015/0210883 A1 | 7/2015 | Swarup et al. | |
| 2015/0267077 A1 | 9/2015 | Janoski, Sr. et al. | |
| 2015/0307738 A1 | 10/2015 | Schmucker et al. | |
| 2015/0368512 A1 | 12/2015 | Bowman et al. | |
| 2016/0068706 A1 | 3/2016 | Swarup et al. | |
| 2016/0152075 A1 | 6/2016 | Shibata | |
| 2018/0230327 A1 | 8/2018 | Kanda | |
| 2019/0085200 A1 * | 3/2019 | Jordan | C08F 283/006 |
| 2019/0085203 A1 * | 3/2019 | Faler | C09D 187/005 |

FOREIGN PATENT DOCUMENTS

| | | |
|---|---|---|
| CN | 101240101 A | 8/2008 |
| CN | 101979255 A | 2/2011 |
| CN | 102181238 A | 9/2011 |
| CN | 102199254 A | 9/2011 |
| CN | 102492281 A | 6/2012 |
| CN | 102702953 A | 10/2012 |
| CN | 202621351 U | 12/2012 |
| CN | 103059703 A | 4/2013 |
| CN | 103386863 A | 11/2013 |
| CN | 103485179 A | 1/2014 |
| CN | 203448247 U | 2/2014 |
| CN | 103846200 A | 6/2014 |
| CN | 103992765 A | 8/2014 |
| CN | 105038625 A | 11/2015 |
| DE | 3016710 A1 | 11/1980 |
| DE | 3325896 A1 | 1/1985 |
| DE | 3416690 A1 | 1/1986 |
| EP | 0765922 A1 | 4/1997 |
| EP | 1040875 A2 | 10/2000 |
| EP | 1454971 A1 | 9/2004 |
| EP | 1669411 A1 | 6/2006 |
| GB | 112332 | 1/1918 |
| GB | 724054 | 2/1955 |
| GB | 752655 | 7/1956 |
| GB | 1567966 | 5/1980 |
| JP | 6262851 A | 3/1987 |
| JP | 5320299 A | 12/1993 |
| JP | 5339542 A | 12/1993 |
| JP | 782456 A | 3/1995 |
| JP | 7188353 A | 7/1995 |
| JP | 7242855 A | 9/1995 |
| JP | 892533 A | 4/1996 |
| JP | 8309879 A | 11/1996 |
| JP | 10139839 A | 5/1998 |
| JP | 10259356 A | 9/1998 |
| JP | 10265735 A | 10/1998 |
| JP | 11501586 A | 2/1999 |
| JP | 2000345092 A | 12/2000 |
| JP | 200140272 A | 2/2001 |
| JP | 200140319 A | 2/2001 |
| JP | 2001138459 A | 5/2001 |
| JP | 2001278923 A | 10/2001 |
| JP | 200288215 A | 3/2002 |
| JP | 2003306006 A | 10/2003 |
| JP | 2005264136 A | 9/2005 |
| JP | 200656973 A | 3/2006 |
| JP | 200784730 A | 4/2007 |
| JP | 20081779 A | 1/2008 |
| JP | 200813741 A | 1/2008 |
| JP | 201053340 A | 3/2010 |
| JP | 2010255153 A | 11/2010 |
| JP | 201126463 A | 2/2011 |
| JP | 201169020 A | 4/2011 |
| JP | 4953355 B2 | 3/2012 |
| JP | 2012101611 A | 5/2012 |
| JP | 2012101612 A | 5/2012 |
| JP | 5035742 B2 | 9/2012 |
| JP | 2012214928 A | 11/2012 |
| JP | 2014129484 A | 7/2014 |
| JP | 2014161832 A | 9/2014 |
| JP | 20156737 A | 1/2015 |
| JP | 5703108 B2 | 4/2015 |
| KR | 101086454 B1 | 11/2011 |
| KR | 101098516 B1 | 12/2011 |
| WO | 8501250 A1 | 3/1985 |
| WO | 9747401 A1 | 12/1997 |
| WO | 03089487 A1 | 10/2003 |
| WO | 2005105425 A2 | 11/2005 |
| WO | 2010015494 A2 | 2/2010 |
| WO | 2011127641 A1 | 10/2011 |
| WO | 2013027093 A1 | 2/2013 |
| WO | 2015030955 A1 | 3/2015 |
| WO | 2017038306 A1 | 3/2017 |
| WO | 2017160398 A1 | 9/2017 |
| WO | 2017180220 A1 | 10/2017 |

OTHER PUBLICATIONS

Jin et al., "Better Rubber to Substrate Adhesion via Better Interfacial Chemistry", Fall 178th Technical Meeting of the Rubber Division of the American Chemical Society, Inc., 2010, pp. 1-19, Paper #97, Milwaukee, WI.

Kessel et al., "The diacetone acrylamide crosslinking reaction and its influence on the film formation of an acrylic latex", J. Coat. Technol. Res., 2008, pp. 285-297, vol. 5:3.

Navarro-Banon et al., "Water-based chlorination treatment of SBS rubber soles to improve their adhesion to waterborne polyurethane adhesives in the footwear industry", J. Adhesion Sci. Technol., 2005, pp. 947-974, vol. 19:11.

Okamoto et al., "Urethane/acrylic composite polymer emulsions", Progress in Organic Coatings, 1996, pp. 175-182, vol. 29.

Zhang et al., "The Diacetone Acrylamide Crosslinking Reaction and Its Control of Core-Shell Polyacrylate Latices at Ambient Temperature", Journal of Applied Polymer Science, 2012, pp. 1822-1832, vol. 123.

* cited by examiner

COATING COMPOSITIONS CONTAINING POLYTHIOETHERS AND ELASTIC BARRIER COATINGS FORMED THEREFROM

FIELD OF THE INVENTION

The present invention relates to coating compositions and elastic barrier coatings formed from the coating compositions.

BACKGROUND OF THE INVENTION

Barrier coatings are used to reduce permeation of vapor, gas, and/or chemicals through a substrate. Because of these properties, barrier coatings are typically applied to tires, bladders of sporting equipment, and similar substrates to reduce the ingress and egress of gas. However, barrier coatings are generally brittle at low temperatures and, therefore, have a negative effect on the elasticity of the substrate. Thus, it is desirable to develop improved coatings that provide good elasticity and gas barrier performance at both high and low temperatures.

SUMMARY OF THE INVENTION

The present invention is directed to a coating composition that comprises: (a) core-shell particles comprising a polymeric core at least partially encapsulated by a polymeric shell; (b) a polythioether comprising thioether linkages and mercapto functional groups; and (c) an adhesion promoter comprising at least one polymer that is different from (a) and (b). The polymeric shell of (a) comprises: (i) a barrier segment comprising aromatic groups and urethane linkages, urea linkages, or a combination thereof; and (ii) an elastomeric segment that is different from (i), in which the polymeric shell is covalently bonded to at least a portion of the polymeric core.

The present invention further relates to a substrate at least partially coated with a coating formed from a coating composition according to the present invention.

DESCRIPTION OF THE INVENTION

The present invention relates to a coating composition that includes core-shell particles in which a polymeric core is at least partially encapsulated by a polymeric shell. The polymeric shell is also covalently bonded to at least a portion of the polymeric core. The polymeric shell comprises: (i) a barrier segment comprising aromatic groups and urethane linkages, urea linkages, or a combination thereof; and (ii) an elastomeric segment that is different from (i).

A core-shell particle in which the core is at least partially encapsulated by the shell refers to a particle comprising (i) at least a first material that forms the center of the particle (i.e., the core) and (ii) at least a second material (i.e., the shell) that forms a layer over at least a portion of the first material (i.e., the core). Further, the core-shell particles can have various shapes (or morphologies) and sizes. For example, the core-shell particles can have generally spherical, cubic, platy, polyhedral, or acicular (elongated or fibrous) morphologies. The core-shell particles can also have an average particle size of 30 to 300 nanometers, or from 40 to 200 nanometers, or from 50 to 150 nanometers. As used herein, "average particle size" refers to volume average particle size. The average particle size is determined with a Zetasize 3000HS following the instructions in the Zetasize 3000HS manual.

As previously described, the core-shell particles comprise a polymeric core as well as a polymeric shell. A "polymeric core" means that the core of the core-shell particle comprises one or more polymers and a "polymeric shell" means that the shell of the core-shell particle comprises one or more polymers. As used herein, a "polymer" refers to oligomers and homopolymers (e.g., prepared from a single monomer species), copolymers (e.g., prepared from at least two monomer species), and graft polymers. The term "resin" is used interchangeably with the term "polymer."

As indicated, the polymeric shell of the core-shell particles comprises a barrier segment(s) and an elastomeric segment(s). As used herein, the term "barrier segment", with respect to a polymer, refers to a section or sections on the backbone of a polymer that imparts a vapor barrier, gas barrier, and/or chemical barrier when formed into a coating. For example, a polymer comprising the barrier segment(s) can be applied as a coating over the substrate to provide a vapor barrier, gas barrier, and/or chemical barrier. "Vapor barrier" refers to a barrier and/or low permeability to liquid and/or its vapor. "Gas barrier" refers to a barrier and/or low permeability to oxygen, nitrogen, argon, carbon dioxide, and/or other gases. "Chemical barrier" refers to a barrier and/or low permeability to the migration of a molecule from one substrate to another, and/or from within a substrate, e.g. from its interior to its surface or vice versa.

The gas barrier properties of a substrate, and/or any coatings thereon, are typically described in terms of the oxygen permeance ("$P(O_2)$"). The "$P(O_2)$" number quantifies the amount of oxygen that can pass through a substrate and/or coating under a specific set of conditions and is generally expressed in units of $cc \cdot mm/m^2 \cdot day \cdot atm$. This is a standard unit of permeation measured as cubic centimeters of oxygen permeating through one millimeter thickness of a sample, of an area of a square meter, over a 24 hour period, under a partial pressure differential of one atmosphere at 23° C. and 50% relative humidity (R.H.) conditions.

The barrier segment(s) of the polymeric shell of the core-shell particles contained in the coating composition according to the present invention generally comprise(s) aromatic groups as well as urethane linkages, urea linkages, or combinations thereof. In some examples, the polymer that forms at least a portion of the polymeric shell is a polyurethane based polymer comprising aromatic groups, urethane linkages and, optionally, urea linkages that form the barrier segment(s) and additional different segment(s) that form the elastomeric segment(s). The polyurethane based polymer can be formed according to any method known in the art, such as by reacting at least one polyisocyanate with one or more compound(s) having functional groups that are reactive with the isocyanate functionality of the polyisocyanate. Reactive functional groups can be active hydrogen-containing functional groups such as hydroxyl groups, thiol groups, amine groups, and acid groups like carboxylic acid groups. A hydroxyl group may for example react with an isocyanate group to form a urethane linkage. A primary or secondary amine group may react with an isocyanate group to form a urea linkage. Generally the reaction mixture includes at least one hydroxyl-functional reactive compound such as a polyol for formation of urethane functionality.

Typically the compound(s) having functional groups that are reactive with the isocyanate functionality of the polyisocyanate comprise at least one compound having two or more active hydrogen-containing functional groups, e.g.

selected from those mentioned above, per molecule as well as least one compound having one or more active hydrogen-containing functional groups and an ethylenically unsaturated component. As used herein, "ethylenically unsaturated" refers to a group having at least one carbon-carbon double bond. Non-limiting examples of ethylenically unsaturated groups include, but are not limited to, (meth) acrylate groups, vinyl groups, and combinations thereof. As used herein, the term "(meth)acrylate" refers to both the methacrylate and the acrylate.

Non-limiting examples of such reactive compounds include polyols, polyisocyanates, compounds containing carboxylic acid groups including diols containing carboxylic acid groups, hydroxyl functional ethylenically unsaturated components such as hydroxyalkyl esters of (meth)acrylic acid, polyamines, polythiols, and/or other compounds having reactive functional groups, such as hydroxyl groups, thiol groups, amine groups, and carboxylic acids. In some examples, an aromatic polyisocyanate and/or an aromatic compound(s) having functional groups that are reactive with the isocyanate functionality of the polyisocyanate are used in the preparation of the polymer to introduce aromatic barrier segment(s) in the polyurethane polymer.

It is appreciated that polyamines and other art recognized compounds can be used as a chain extender. As used herein, a "chain extender" refers to a lower molecular weight compound, e.g. a compound having an average weight molecular weight ($M_w$) of less than 500 g/mol, having two or more functional groups that are reactive towards isocyanate functional compounds.

Polyisocyanates that can be used in the preparation of the polymer having barrier and elastomeric segments include aliphatic and aromatic diisocyanates as well as higher functional polyisocyanates. Non-limiting examples of suitable polyisocyanates include isophorone diisocyanate (IPDI), dicyclohexylmethane 4,4'-diisocyanate (H12MDI), cyclohexyl diisocyanate (CHDI), m-tetramethylxylylene diisocyanate (m-TMXDI), p-tetramethylxylylene diisocyanate (p-TMXDI), ethylene diisocyanate, 1,2-diisocyanatopropane, 1,3-diisocyanatopropane, 1,6-diisocyanatohexane (hexamethylene diisocyanate or HDI), 1,4-butylene diisocyanate, lysine diisocyanate, 1,4-methylene bis-(cyclohexyl isocyanate), toluene diisocyanate (TDI), m-xylylenediisocyanate (MXDI) and p-xylylenediisocyanate, 4-chloro-1,3-phenylene diisocyanate, 1,5-tetrahydro-naphthalene diisocyanate, 4,4'-dibenzyl diisocyanate, and 1,2,4-benzene triisocyanate, xylylene diisocyanate (XDI), and mixtures or combinations thereof. A polyisocyanate that comprises one or more aromatic group(s) such as toluene diisocyanate (TDI), m-xylylenediisocyanate (MXDI), p-xylylenediisocyanate, and/or 4,4'-dibenzyl diisocyanate can also be used in the preparation of the polymer to form aromatic barrier segment(s).

Examples of polyols that can be used to prepare the polyurethane based polymer include, but are not limited to, polyether polyols, polyester polyols, copolymers thereof, as well as other compounds that comprise two or more hydroxyl groups, and combinations of any of the foregoing. Non-limiting examples of suitable polyether polyols include polytetrahydrofuran, polyethylene glycol, polypropylene glycol, polybutylene glycol, copolymers thereof, and combinations thereof.

Non-limiting examples of polyester polyols include those prepared from a polyol such as a polyol comprising one or more of an ether moiety and a carboxylic acid or anhydride. Suitable polyols include, for example, ethylene glycol, oligomers of ethylene glycol (including diethylene glycol, triethylene glycol and tetraethylene glycol), propylene glycol, and oligomers of propylene glycol (including dipropylene glycol, tripropylene glycol, and tetrapropylene glycol).

Other suitable polyols include, but are not limited to, 1,6-hexanediol, cyclohexanedimethanol, 2-ethyl-1,6-hexanediol, 1,3-propanediol, 1,4-butanediol, neopentyl glycol, dihydroxyalkylated aromatic compounds such as the bis (2-hydroxyethyl) ethers of hydroquinone and resorcinol (HER) which is also referred to as 1,3-bis(2-hydroxyethoxy) benzene, p-xylene-α,α'-diol, the bis (2-hydroxyethyl) ether of p-xylene-α,α'-diol, m-xylene-α,α'-diol and the bis (2-hydroxyethyl) ether of m-xylene-α,α'-diol, trimethylol propane, 1,2,6-hexantriol, glycerol, and combinations thereof.

Suitable carboxylic acids, which can be reacted with the polyols to form a polyester polyol include, but are not limited to, glutaric acid, succinic acid, malonic acid, oxalic acid, phthalic acid, isophthalic acid, hexahydrophthalic acid, adipic acid, maleic acid, and mixtures thereof. Another non-limiting example of a suitable carboxylic acid is a furandicarboxylic acid such as 2,5-furandicarboxylic acid, which can be reacted with an excess of polyols to form polyols containing furan-diester moieties. Anhydrides of these and any other carboxylic acid can also be used.

Furthermore, suitable carboxylic acid groups containing diols that can be used with the present invention include, but are not limited to, 2,2-bis(hydroxymethyl)propionic acid which is also referred to as dimethylolpropionic acid (DMPA), 2,2-bis(hydroxymethyl)butyric acid which is also referred to as dimethylol butanoic acid (DMBA), diphenolic acid, and combinations thereof.

Suitable polyamines that can be used to prepare the polyurethane based polymer include aliphatic and aromatic compounds, which comprise two or more amine groups selected from primary and secondary amine groups. Examples include, but are not limited to, ethylenediamine, hexamethylenediamine, 1,2-propanediamine, 2-methyl-1,5-penta-methylenediamine, 2,2,4-trimethyl-1,6-hexanediamine, isophoronediamine, diaminocyclohexane, xylylenediamine, 1,12-diamino-4,9-dioxadodecane, p-phenylenediamine, m-phenylenediamine, benzidine, 4,4'-methylenedianiline, 4,4'-methylenebis (2-chloroaniline), and combinations thereof.

Other non-limiting examples of suitable polyamine functional compounds include the Michael addition reaction products of a polyamine functional compound, such as a diamine, with keto and/or aldo group containing ethylenically unsaturated monomers. The polyamine functional compound typically comprises at least two primary amino groups (i.e., a functional group represented by the structural formula —NH$_2$), and the keto and/or aldo group containing ethylenically unsaturated monomers include, but are not limited to, (meth)acrolein, diacetone (meth)acrylamide, diacetone (meth)acrylate, acetoacetoxyethyl (meth)acrylate, vinyl acetoacetate, crotonaldehyde, 4-vinylbenzaldehyde, and combinations thereof. The resulting Michael addition reaction products can include a compound with at least two secondary amino groups (i.e., a functional group represented by the structural formula —NRH in which R is a hydrocarbonyl group) and at least two keto and/or aldo functional groups. It is appreciated that the secondary amino groups will react with the isocyanate functional groups of the polyurethane prepolymers to form urea linkages and chain extend the polyurethanes. Further, the keto and/or aldo functional groups will extend out from the backbone of the chain-extended polyurethane, such as from the nitrogen atom of the urea linkage for example, to form a polyurethane with pendant keto and/or aldo functional groups.

Suitable amino alcohols that can be used to prepare the polyurethane based polymer include, but are not limited to, ethanolamine, propanolamine, butanolamine, and combinations thereof.

Non-limiting examples of hydroxyalkyl esters of (meth) acrylic acid include hydroxymethyl (meth)acrylate, hydroxyethyl (meth)acrylate, hydroxypropyl (meth)acrylate, hydroxybutyl (meth)acrylate, and combinations thereof. Further, non-limiting examples of keto functional monoalcohols include, but are not limited to, hydroxyacetone, 4-hydroxy-2-butanone, 5-hydroxy-4-octanone, and combinations thereof. Non-limiting examples of aldo functional monoalcohols include D-lactaldehyde solution, 4-hydroxy-pentanal, 5-hydroxy-hexanal, 5-hydroxy-5-methylhexanal, 4-hydroxy-4-methyl-pentanal, 3-hydroxy-3-methylbutanal, and combinations thereof.

As previously described, the polymer that forms at least a portion of the polymeric shell comprises aromatic groups which have been found to increase the barrier properties of a coating formed from a coating composition of the present invention including with the core-shell particles.

As used herein, the term "aromatic" refers to a cyclically conjugated moiety with a stability (due to delocalization) that is significantly greater than that of a hypothetical localized structure. The aromatic ring can include aromatic carbocyclic or heteroaromatic ring structures. An "aromatic carbocyclic ring" refers to an aromatic ring with the aromatic group completely formed by bonded carbon atoms, and a "heteroaromatic ring" refers to an aromatic ring with at least one carbon atom of the aromatic group replaced by a heteroatom such as nitrogen, oxygen, sulfur, or a combination thereof. The aromatic groups can be incorporated into the polymer through any of the previously described components used to form the polymer. For example, aromatic groups can be introduced into the backbone of the polymer with: hydroxyl containing compounds having aromatic groups such as bis(2-hydroxyethyl)ethers of hydroquinone resorcinol (HER) and diols containing furan rings; polyisocyanates having aromatic groups such as tetramethylxylylene diisocyanates or TDI; polyamines having aromatic groups such as xylylene diamines; and combinations thereof. In some examples, the polymer is a polyurethane based polymer having aromatic groups and which is prepared from a reaction mixture comprising (i) an aromatic diisocyanate and (ii) an aliphatic polyester polyol or an aliphatic polyether polyol, and (iii) optional further components such as aromatic or aliphatic polyol components including carboxyl-functional diols, and/or polyamines.

Further, the aromatic groups incorporated into the polymer that forms the polymeric shell can comprise a six-membered aromatic ring that is substituted at any position such as the ortho, meta, and/or para position relative to the first substituent. For example, the aromatic groups used to form the polymer can comprise a meta substituted six-membered aromatic ring. Non-limiting examples of meta substituted six membered aromatic rings include bis(2-hydroxyethyl)ethers of hydroquinone resorcinol (HER), tetramethylxylylene diisocyanate, and m-xylylenediamine. It is appreciated that the aromatic groups incorporated into the polymer are not limited to six-membered rings and can be selected from other membered rings including, but are not limited to, five-membered aromatic rings such as furan containing compounds as previously described.

The polymer that forms at least a portion of the polymeric shell can comprise at least 10 weight %, at least 20 weight %, or at least 30 weight % of aromatic materials, based on the total solids weight of the polymeric shell. For example, the polymer can comprise at least 10 weight %, at least 20 weight %, or at least 30 weight % of meta-substituted aromatic materials. The percent of aromatic material can be determined, for example, by adding the weight of all the monomers containing aromatic material such as a meta-substituted aromatic group, dividing that number by the total solid weight of the final resin and multiplying by 100. For example, for a polymer made from 200 g of bis(2-hydroxyethyl)ether of hydroquinone resorcinol (HER), 250 g of tetramethylxylylene diisocyanate, and 550 g of a polyether polyol, add the weights of the two aromatic monomers (200 g plus 250 g), divide by the total weight (1000 g), and multiply by 100 to obtain 45% aromatic material.

Any combination of the previously described components can be used to form the barrier segment(s) of the polymer. For example, polyols (such as 1,3-bis(2-hydroxyethoxy) benzene) can be reacted with polyisocyanates (such as TDI) to form urethane linkages and polyamines (such as m-xylylenediamine) can be reacted with polyisocyanates to form urea linkages. It is appreciated that one or more of the polyols, polyisocyanates, and/or polyamines can provide aromatic groups to the polyurethane. It is further appreciated that the polyol that contributes to the formation of the barrier segments can also provide the elastomeric segments of the final polymer. For instance, a polyol can be reacted with an isocyanate to form urethane moieties (as part of the barrier segment) while the remaining residual moiety (e.g. the polyether or polyester backbone) forms an elastomeric segment.

The barrier segment of the polymeric shell can have a glass transition temperature ($T_g$) of greater than 0° C., greater than 10° C., or greater than 20° C. The glass transition temperature ($T_g$) is determined by dynamic mechanical analysis using a model QA800 Dynamic Mechanical Analysis made by TA Instruments (New Castle, Del.) using the following parameters: mode: tension film, amplitude: 20 μm, frequency: 1 Hz, clamping force: 15 cNm, temperature cycle: −100° C. to 175° C., heating rate: 3° C./min., sample dimensions: 15.0 length×~6.5 width (mm). The peaks of the Tan Delta curves provide the $T_g$'s of the different segments by taking in consideration the known peaks of the materials forming the barrier segments and the materials forming the elastomeric segments.

Further, the barrier segment(s) can comprise at least 30 weight % or at least 40 weight % of the polymer that forms the polymeric shell, based on the total solids weight of the polymer that forms the polymeric shell. The barrier segment(s) can also comprise up to 70 weight % or up to 60 weight % of the polymer that forms the polymeric shell, based on the total solids weight of the polymer that forms the polymeric shell. The polymer may for example comprise the barrier segment(s) in an amount of from 30 weight % to 70 weight % or from 40 weight % to 60 weight %, based on the total solids weight of the polymer that forms the polymeric shell.

As indicated, the polymer that forms the polymeric shell also includes elastomeric segment(s). The term "elastomeric segment", with respect to a polymer, refers to a section or sections in the backbone of a polymer that imparts a degree of elasticity that is higher than that of the barrier segment in the polymer and which helps provide the elastomeric properties in a coating formed from a coating composition containing the polymer such as when a coating formed from a coating composition containing the polymer is applied over a substrate. "Elastomeric" and like terms as used herein refer to materials that impart elasticity. "Elasticity" and like terms refer to the ability of a material to return to its approximate original shape or volume after the material has been deformed, such as for example stretched.

The elastomeric properties of a substrate, and/or any coatings thereon, are typically described in terms of the elongation at break. "Elongation at break" and like terms refer to the amount of elongation a substrate or coating can withstand prior to breaking or cracking. Elongation at break is determined with an INSTRON® model 4443 SFL unit with a temperature controlled test chamber (commercially available from Instron Corp.). The test rate for elongation at break measurements at −40° C. is run at 5 mm/minute and the test rate for elongation at break measurements at room temperature (i.e., 20° C. to 25° C., such as 23° C.) is run at 50 mm/minute.

The elastomeric properties of a coating can also be determined by testing the storage modulus of the coating. "Storage modulus" refers to the ability of a material to store energy elasticity and can be related to the stiffness of the material. The storage modulus is determined by dynamic mechanical analysis using a model QA800 Dynamic Mechanical Analysis made by TA Instruments (New Castle, Del.) using the following parameters: mode: tension film, strain: 1%, frequency: 1 Hz, clamping force: 20 cNm, temperature cycle: −70° C. to 175° C., heating rate: 3° C./min., sample dimensions: 10.0 length×~6.5 width (mm). The lower the storage modulus the better the elastomeric properties of the coating at a particular temperature.

The elastomeric properties of a coating can further be determined by testing the Young's modulus of the coating. "Young's modulus" refers to the resistance of a material to elastic (recoverable) deformation under load. The Young's modulus is determined by using INSTRON® software analysis collected during the "elongation at break test" using an INSTRON® model 4443 SFL unit with a temperature controlled test chamber (commercially available from Instron Corp.). The lower the Young's modulus the better the elastomeric properties of the coating at a particular temperature.

The elastomeric segment(s) of the polymer are different from the barrier segment(s). The elastomeric segment(s) can, for example, comprise ester linkages, ether linkages, sulfide linkages, natural rubber, synthetic rubber, or combinations thereof. For example, the elastomeric segment(s) of the polymer can be formed by ester linkages from a polyester, ether linkages from a polyether, sulfide linkages from a polysulfide, rubber based polymers, copolymers thereof, or combinations thereof.

Non-limiting examples of polyethers and polyesters suitable for forming the elastomeric segment(s) include any of the polyethers and polyesters previously described. Non-limiting examples of suitable polysulfides are commercially available under the trade name THIOPLAST®, a liquid polysulfide polymer, supplied by Akzo Nobel, Greiz, Germany. Other suitable polysulfides can include polysulfides described in "Sealants" by Adolfas Damusis, Reinhold Publishing Corp., 1967, at pages 175-195, which is incorporated by reference herein. Polysulfides are also described in U.S. Patent Application Publication No. 2015/0368512 at paragraphs [0025] to [0030], which is incorporated by reference herein.

Non-limiting examples of rubber based polymers include cis-1,4-polyisoprene rubber, styrene/butadiene copolymers, polybutadiene rubber, styrene/isoprene/butadiene rubber, butyl rubber, halobutyl rubber, and combinations thereof.

The elastomeric segment(s) of the polymer can have a glass transition temperature ($T_g$) of less than 0° C., less than −20° C., or less than −50° C. The glass transition temperature ($T_g$) is determined by dynamic mechanical analysis with a model QA800 Dynamic Mechanical Analysis made by TA Instruments (New Castle, Del.) as previously described.

Further, the elastomeric segment(s) can comprise at least 30 weight % or at least 40 weight % of the polymer that forms the polymeric shell, based on the total solids weight of the polymer that forms the polymeric shell. The elastomeric segment(s) can also comprise up to 70 weight % or up to 60 weight % of the polymer that forms the polymeric shell, based on the total solids weight of the polymer that forms the polymeric shell. The polymer may, for example, comprise the elastomeric segment(s) in an amount of from 30 weight % to 70 weight % or from 40 weight % to 60 weight %, based on the total solids weight of the polymer that forms the polymeric shell.

The polymer comprising barrier and elastomeric segments can be prepared by reacting any of the previously described components that form the barrier and elastomeric segments. For example, the polymer that forms the polymeric shell can be prepared by reacting a polyester or polyether polyol, other hydroxyl containing compounds such as 1,3-bis(2-hydroxyethoxy) benzene, a polyisocyanate, carboxyl group-containing diols such as dimethylolpropionic acid (DMPA), a hydroxyl functional ethylenically unsaturated component, and, optionally, diamine compounds. Such polymers can have barrier segment(s) formed by aromatic groups, urethane linkages, and optionally urea linkages as well as elastomeric segment(s) formed by the ester or ether linkages.

The components that form the polymer can be reacted in a stepwise manner, or they can be reacted simultaneously. For example, the polymer can be a polyurethane formed by reacting a diisocyanate, a polyol, a carboxyl group-containing diol, and a hydroxyl group-containing ethylenically unsaturated monomer. The polyurethane can also be prepared in the presence of catalysts, polymerization inhibitors, and combinations thereof. Non-limiting examples of catalysts include triethylamine, N-ethyl morpholine, tributylamine, and the like, as well as tin type catalysts such as dibutyl tin dilaurate, dioctyl tin dilaurate, and the like. Polymerization inhibitors that can be used to prevent polymerization of the ethylenically unsaturated compounds during formation of the polyurethane include hydroquinone, hydroquinone monomethyl ether, p-benzoquinone, and the like.

The polymer that forms the polymeric shell can also have a particular polymer architecture. For example, the polymer comprising barrier and elastomeric segments can have a linear random copolymer architecture or a linear block copolymer architecture. As used herein, a "random copolymer" refers to a polymer with multiple monomer units arranged in an irregular, random order. A "block copolymer" refers to a polymer with multiple sequences, or blocks, of the same monomer alternating in series with at least another block having different monomers. The block copolymer can be a diblock copolymer (copolymer with two types of blocks), a triblock copolymer (copolymer with three types of blocks), a multiblock copolymer (copolymer with four or more types of blocks), and combinations thereof. In some examples, the polymer is a block copolymer comprising: at least one block having aromatic groups and urethane linkages, urea linkages, or a combination thereof; and at least a second different block having ester linkages, ether linkages, or a combination thereof.

Further, the polymer that forms the polymeric shell can comprise one or more, such as two or more, reactive functional groups. The term "reactive functional group" refers to an atom, group of atoms, functionality, or group having sufficient reactivity to form at least one covalent bond with another reactive group in a chemical reaction. Non-limiting examples of reactive functional groups include carboxylic acid groups, keto functional groups (also referred to as ketone functional groups), aldo functional groups (also referred to as aldehyde functional groups), amine groups, epoxide groups, hydroxyl groups, thiol groups, isocyanate groups (including blocked isocyanate groups), ethylenically unsaturated groups, and combinations thereof. It is appreciated that the polymer comprising barrier and elastomeric segments can also be free of (i.e., does not contain) any of the previously described reactive functional groups.

As previously described, the core-shell particles of the present invention includes a polymeric core that is at least partially encapsulated by the polymeric shell. The polymeric core may for example comprise at least an addition polymer (i.e., a polymer formed from the linking of monomers without the co-generation of other by-products). The addition polymer of the polymeric core may be obtained by polymerization (e.g., by emulsion polymerization) of one or more ethylenically unsaturated monomers.

The ethylenically unsaturated monomers can comprise multi-ethylenically unsaturated monomers, mono-ethylenically unsaturated monomers, or combinations thereof. A "mono-ethylenically unsaturated monomer" refers to a monomer comprising only one ethylenically unsaturated group, and a "multi-ethylenically unsaturated monomer" refers to a monomer comprising two or more ethylenically unsaturated groups.

Non-limiting examples of ethylenically unsaturated monomers include, but are not limited to, alkyl esters of (meth)acrylic acid, hydroxyalkyl esters of (meth)acrylic acid, acid group containing unsaturated monomers, vinyl aromatic monomers, aldo or keto containing unsaturated monomers, and combinations thereof.

Non-limiting examples of alkyl esters of (meth)acrylic acid include methyl (meth)acrylate, ethyl (meth)acrylate, butyl (meth)acrylate, isobutyl (meth)acrylate, ethylhexyl (meth)acrylate, lauryl (meth)acrylate, octyl (meth)acrylate, glycidyl (meth)acrylate, isononyl (meth)acrylate, isodecyl (meth)acrylate, vinyl (meth)acrylate, acetoacetoxyethyl (meth)acrylate, acetoacetoxypropyl (meth)acrylate, and combinations thereof. Other non-limiting examples include di(meth)acrylate alkyl diesters.

Non-limiting examples of hydroxyalkyl esters of (meth)acrylic acid, and keto and aldo containing unsaturated monomers include any of those previously described. Non-limiting examples of acid group containing unsaturated monomers include (meth)acrylic acid, itaconic acid, maleic acid, fumaric acid, crotonic acid, aspartic acid, malic acid, mercaptosuccinic acid, and combinations thereof.

Non-limiting examples of vinyl aromatic monomers include styrene, 2,4-dimethylstyrene, ethylstyrene, isopropylstyrene, butylstyrene, vinyl naphthalene, vinyl toluene, divinyl aromatic monomers such as divinyl benzene, and combinations thereof.

The polymeric core can also have a glass transition temperature of less than 25° C., such as less than 20° C., less than 10° C., less than 0° C., less than −10° C., or less than −20° C., or less than −30° C., or less than −40° C. The $T_g$ is based on the supplied/known $T_g$ of the materials used to form the polymeric core. The $T_g$ is determined using differential scanning calorimetry (DSC) according to E1356-08 (2014).

After forming the polymer for the polymeric shell (such as the above identified polyurethane for example), the polymer and additional ethylenically unsaturated monomers can be subjected to a polymerization process to form the core-shell particles. The additional ethylenically unsaturated monomers can be added after forming the polymer for the polymeric shell. Alternatively, the additional ethylenically unsaturated monomers can be used as a diluent during preparation of the polymer and not added after formation of the polymer. It is appreciated that ethylenically unsaturated monomers can be used as a diluent during preparation of the polymer and also added after formation of the polymer. The polymerization can be conducted using art recognized techniques as well as conventional additives such as emulsifiers, protective colloids, free radical initiators, and chain transfer agents known in the art.

It is appreciated that the polymeric core can include any of the previously described reactive functional groups with respect to the polymeric shell. Alternatively, the polymeric core can be free of any or all of the previously described reactive functional groups. Further, the polymeric core and polymeric shell of the core-shell particles can be prepared to provide a hydrophilic polymeric shell with enhanced water-dispersibility/stability and a hydrophobic polymeric core. As such, the polymeric shell can comprise hydrophilic water-dispersible groups while the polymeric core can be free of hydrophilic water-dispersible groups. For example, the polymeric shell can comprise carboxylic acid functional groups that can be at least partially neutralized (i.e., at least 30 percent of the total neutralization equivalent) by a base, such as a volatile amine, to form a salt group, while the hydrophobic polymeric core can be free of carboxylic acid groups and salt groups formed therefrom. Examples of suitable amines are ammonia, dimethylamine, trimethylamine, monoethanolamine, and dimethylethanolamine. It is appreciated that the amines will evaporate during the formation of the coating to expose the carboxylic acid functional groups and allow the carboxylic acid functional groups to undergo further reactions such as with a cross-linking agent reactive with the carboxylic acid functional groups. Other non-limiting examples of water-dispersible groups include polyoxyalkylene groups. The hydrophilic water-dispersible groups can increase the water-dispersibility/stability of the polymeric shell in the aqueous medium so that the polymeric shell at least partially encapsulates the hydrophobic core.

In some examples, the polymeric core comprises a (meth)acrylate polymer and the polymeric shell comprises a polyurethane with pendant and/or terminal carboxylic acid functional groups and, optionally, other reactive functional groups such as hydroxyl groups. A "pendant group" refers to a side group that is an offshoot from the side of the polymer backbone and which is not part of the polymer backbone. In contrast, a "terminal group" refers to a group on an end of the polymer backbone and which is part of the polymer backbone.

The polymeric shell can also be covalently bonded to at least a portion of the polymeric core. For example, the polymeric shell can be covalently bonded to the polymeric core by reacting at least one functional group on the monomers and/or prepolymers that are used to form the polymeric shell with at least one functional group on the monomers and/or prepolymers that are used to form the polymeric core. The functional groups can include any of the functional groups previously described provided that at least one functional group on the monomers and/or prepolymers that are used to form the polymeric shell is reactive with at least one functional group on the monomers and/or prepolymers that are used to form the polymeric core. For instance, the monomers and/or prepolymers that are used to form the polymeric shell and polymeric core can both comprise at least one ethylenically unsaturated group that are reacted with each other to form a chemical bond. As used herein, a "prepolymer" refers to a polymer precursor capable of further reactions or polymerization by one or more reactive groups to form a higher molecular mass or cross-linked state.

In some examples, the core-shell particles of the present invention are prepared with: (i) ethylenically unsaturated monomers; (ii) polyurethane prepolymers comprising isocyanate functional groups, aromatic groups, carboxylic acid functional groups, ethylenically unsaturated groups, and, optionally hydroxyl functional groups; and (iii) optionally, a diamine that may or may not include aromatic groups. The resulting core-shell particles comprise a polymeric core prepared from ethylenically unsaturated monomers that is covalently bonded to at least a portion of a polyurethane shell having pendant carboxylic acid functional groups, urethane linkages, aromatic groups, and, optionally, urea linkages. For enhanced water-dispersibility/stability, the carboxylic acid functional groups on the polymeric shell can be at least partially neutralized (i.e., at least 30 percent of the total neutralization equivalent) by an inorganic base, such as a volatile amine, to form a salt group as previously described.

The core-shell particles can also be prepared such that the shell comprises at least 75 weight % of the core-shell particles, based on the total solids weight of the core-shell particle. In some examples, the core-shell particles are prepared such that the shell comprises at least 80 weight % of the core-shell particles, or at least 85 weight % of the core-shell particles, or least 90 weight % of the core-shell particles, based on the total solids weight of the core-shell particle.

As indicated, the polymeric core-shell particles are dispersed in an aqueous carrier medium of the coating composition according to the present invention. It is appreciated that any combination of core-shell particles described herein can be dispersed in an aqueous medium to form a latex. As used herein, a "latex", with respect to the core-shell particles, refers to an aqueous colloidal dispersion of the polymeric particles.

As used herein, an "aqueous medium" refers to a liquid medium comprising at least 50 weight % water, based on the total weight of the liquid medium. Such aqueous liquid mediums can comprise at least 60 weight % water, or at least 70 weight % water, or at least 80 weight % water, or at least 90 weight % water, or at least 95% water, based on the total weight of the liquid medium. The solvents that make up less than 50 weight % of the liquid medium include organic solvents. Non-limiting examples of suitable organic solvents include polar organic solvents e.g. protic organic solvents such as glycols, glycol ether alcohols, alcohols, and volatile ketones, glycol diethers, esters, and diesters. Other non-limiting examples of organic solvents include aromatic and aliphatic hydrocarbons.

In contrast, a "non-aqueous medium" refers to a liquid medium comprising less than 50 weight % water, based on the total weight of the liquid medium. Such non-aqueous liquid mediums can comprise less than 40 weight % water, or a less than 30 weight % water, or less than 20 weight % water, or less than 10 weight % water, or less than 5% water, based on the total weight of the liquid medium. The solvents that form 50 weight % or more of the non-aqueous liquid medium include any of the solvents previously described.

The core-shell particles can comprise at least 20 weight %, at least 30 weight %, at least 40 weight %, or at least 50 weight %, of the coating composition, based on the total solids weight of the coating composition of the present invention. The core-shell particles can comprise up to 90 weight %, such as up to 80 weight %, up to 70 weight %, or up to 60 weight % of the coating composition according to the present invention, based on the total solids weight of the coating composition. For example, the coating composition of the present invention can comprise the core-shell particles in an amount of from 20 to 90 weight %, or from 30 to 80 weight %, or from 35 to 55 weight % of the coating composition, based on the total solids weight of the coating composition.

As previously described, the coating composition also includes a polythioether. As used herein, a "polythioether" refers to a polymer that comprises thioether linkages (—R—S—R—). The polythioether used in the coating composition also includes mercapto functional groups (R—S—H) such as terminal mercapto functional groups. The polythioether used in the coating composition can comprise at least 2 mercapto functional groups per polymer chain, or at least 2.5 mercapto functional groups per polymer chain. The polythioether used in the coating composition can comprise up to 6 mercapto functional groups per polymer chain, or up to 4 mercapto functional groups per polymer chain, or up to 3 mercapto functional groups per polymer chain. The polythioether can also comprise an amount of mercapto functional groups within a range, for example, of from 2 mercapto functional groups per polymer chain to 6 mercapto functional groups per polymer chain, or from 2 mercapto functional groups per polymer chain to 4 mercapto functional groups per polymer chain.

The polythioether used in the coating composition can comprise an average weight molecular weight of at least 3,000 g/mol, at least 3,500 g/mol, or at least 4,000 g/mol. The polythioether can comprise an average weight molecular weight of up to 8,000 g/mol, up to 7,000 g/mol, up to 6,000 g/mol, or up to 5,000 g/mol. The polythioether can also comprise an amount of mercapto functional groups within a range, for example, of from 3,000 g/mol to 8,000 g/mol, or from 3,500 g/mol to 6,000 g/mol, or from 4,000 g/mol to 6,000 g/mol. The weight average molecular weight is measured by gel permeation chromatography relative to linear polystyrene standards of 800 to 900,000 Da using a Waters 2695 separation module with a Waters 2414 differential refractometer (RI detector) and tetrahydrofuran (THF) as the eluent at a flow rate of 1 ml min-1. Two PLgel Mixed-C (300×7.5 mm) columns are used for separation.

It is appreciated that the polythioether can include additional linkages and/or functional groups including, but not limited to, any of the linkages and functional groups previously described. For example, the polythioether can further comprise ether linkages (—R—O—R—) in addition to the thioether linkages and mercapto functional groups (also known as thiol functional groups).

Non-limiting examples of polythioethers that can be used with the coating composition of the present invention are also described in U.S. Pat. No. 5,912,319 at column 2, line 21 to column 20, line 33, which is incorporated by reference herein. Other non-limiting examples of additional polymers are described in U.S. Pat. No. 8,716,402 at column 4, line 34 to column 5, line 2, which is incorporated by reference herein.

The polythioether can also be dispersed in an aqueous medium to form a separate dispersion before being combined with the other components of the coating composition. The polythioether dispersion is then combined with other components to form the coating composition. The polythioether can also be dispersed with the previously described components and then combined with other components to form the coating composition according to the present invention.

The polythioether can comprise at least 2 weight %, at least 3 weight %, or at least 5 weight %, of the coating composition, based on the total solids weight of the coating composition of the present invention. The polythioether can comprise up to 50 weight %, up to 40 weight %, up to 30 weight %, or up to 20 weight % of the coating composition according to the present invention, based on the total solids weight of the coating composition. For example, the coating composition of the present invention can comprise the polythioether in an amount of from 2 to 50 weight %, or from 3 to 40 weight %, or from 5 to 25 weight % of the coating composition, based on the total solids weight of the coating composition.

It was found that the polythioether can further increase elasticity of the final coating at low temperatures such as at −40° C. For instance, the polythioether can help improve the storage modulus of the final coating at low temperatures such as at −40° C. The polythiother can also increase the solids content of the final coating.

The coating composition also includes an adhesion promoter. As used herein, an "adhesion promoter" refers to a component or group of components, such as polymers for example, that increase the adhesion of a coating layer to a substrate. The adhesion promoter used in the coating compositions according to the present invention can include, but is not limited to, (a) at least one epoxy functional polymer and a thiol functional crosslinker reactive with the epoxy functional polymer, (b) a hydrazide functional component, or (c) a combination of (a) and (b).

The epoxy functional polymer can include various types of polymers provided that the polymer comprises two or more epoxy functional groups per molecule. Non-limiting examples of such polymers include epoxy-functional polyurethanes, (meth)acrylate polymers, polyester polymers, polyamide polymers, polyether polymers, copolymers thereof, and mixtures thereof. Suitable epoxy functional polymers also include, but are not limited to, polyglycidyl ethers of Bisphenol A, such as EPON® 828 and 1001 epoxy resins, and Bisphenol F diepoxides, such as EPON® 862, which are commercially available from Hexion Specialty Chemicals, Inc. Other suitable epoxy functional polymers include, but are not limited to, polyglycidyl ethers of polyhydric alcohols, polyglycidyl esters of polycarboxylic acids, polymers that are derived from the epoxidation of an olefinically unsaturated alicyclic compound, polymers containing oxyalkylene groups in the epoxy molecule, and epoxy novolac resins. Still other suitable epoxy-containing compounds include epoxidized Bisphenol A novolacs, epoxidized phenolic novolacs, epoxidized cresylic novolac, and triglycidyl p-aminophenol bismaleimide. The epoxy-containing compound may also comprise an epoxy-dimer acid adduct. The epoxy-dimer acid adduct may be formed as the reaction product of reactants comprising a diepoxy functional compound (such as a polyglycidyl ether of Bisphenol A) and a dimer acid (such as a C36 dimer acid). The epoxy-containing compound may also comprise a carboxyl-terminated butadiene-acrylonitrile copolymer modified epoxy-containing compound.

The epoxy functional compound may also comprise an epoxy-adduct. As used herein, the term "epoxy-adduct" refers to a reaction product comprising the residue of an epoxy compound and at least one other compound that does not include an epoxy functional group. For example, the epoxy-adduct may comprise the reaction product of reactants comprising: (1) an epoxy compound, a polyol, and an anhydride; (2) an epoxy compound, a polyol, and a diacid; or (3) an epoxy compound, a polyol, an anhydride, and a diacid. The epoxy functional compound used to form the epoxy-adduct may comprise any of the epoxy-containing compounds previously described.

Moreover, the polyol that can be used to form the epoxy-adduct may include diols, triols, tetraols and higher functional polyols, i.e. polyols having more than four hydroxyl groups per molecule. Suitable polyols may also include polyether polyols, polyurethane polyols, polyurea polyols, acrylic polyols, polyester polyols, polybutadiene polyols, hydrogenated polybutadiene polyols, polycarbonate polyols, polysiloxane polyols, and combinations thereof. Polyamines corresponding to polyols may also be used, and in this case, amides instead of carboxylic esters will be formed with the diacids and anhydrides. The polyol may also include lactone based polyesters. As used herein, a "lactone" refers to a cyclic ester in which the oxygen and carbonyl atoms of the ester group are part of the ring backbone. A "lactone based polyester" refers to a polyester formed by ring-opening polymerization lactones with a one or more additional compounds such as hydroxyl functional compounds. The term "lactone based polyester" is also referred to herein as a "polylactone".

Non-limiting examples of suitable lactones that can be used to prepare the polyester include ε-caprolactone, β-propiolactone, γ-butyrolactone, δ-valerolactone, and combinations thereof. Further, the hydroxyl functional compounds that are reacted with the lactones include compounds comprising two or more, such as three or more, or four more, hydroxyl groups. Non-limiting examples of suitable hydroxyl containing compounds include ethylene glycol, propanediols, butanediols, pentanediols, hexanediols, heptanediols, trimethylolpropane, trimethylolethane, 1,2,5-hexanetriol, polyether triols, di-trimethylol propane, pentaerythritol, di-pentaerythritol, trimethylol butane, glycerol, and combinations thereof.

In some examples, the polyol comprises a polycaprolactone-based polyester polyol. The polycaprolactone-based polyol may comprise diols, triols or tetraols terminated with primary hydroxyl groups. Commercially available polycaprolactone-based polyols include those sold under the trade name Capa™ from Perstorp Group, such as, for example, Capa™ 2054, Capa™ 2077A, Capa™ 2085, Capa™ 2205, Capa™ 3031, Capa™ 3050, Capa™ 3091 and Capa™ 4101.

The polyol may also comprise a polytetrahydrofuran-based polyol. The polytetrahydrofuran-based polyols may comprise diols, triols or tetraols terminated with primary hydroxyl groups. Commercially available polytetrahydrofuran-based polyols include those sold under the trade name Terathane®, such as Terathane® 250 and Terathane® 650, available from Invista. In addition, polyols based on dimer diols sold under the trade names Pripol®, Solvermol™ and Empol®, available from Cognis Corporation, or bio-based polyols, such as the tetrafunctional polyol Agrol 4.0, available from BioBased Technologies, may also be utilized.

According to the present invention, the anhydride that may be used to form the epoxy-adduct may comprise any suitable acid anhydride known in the art. For example, the anhydride may comprise hexahydrophthalic anhydride and its derivatives (e.g., methyl hexahydrophthalic anhydride); phthalic anhydride and its derivatives (e.g., methyl phthalic anhydride); maleic anhydride; succinic anhydride; trimelletic anhydride; pyromelletic dianhydride (PMDA); 3,3',4, 4'-oxydiphthalic dianhydride (ODPA); 3,3',4,4'-benzophenone tetracarboxylic dianhydride (BTDA); and 4,4'-diphthalic (hexafluoroisopropylidene) anhydride (6FDA).

According to the present invention, the diacid that may be used to form the epoxy-adduct may comprise any suitable diacid known in the art. For example, the diacids may comprise phthalic acid and its derivates (e.g., methyl phthalic acid), hexahydrophthalic acid and its derivatives (e.g., methyl hexahydrophthalic acid), maleic acid, succinic acid, adipic acid, and the like.

According to the present invention, the epoxy-adduct can also be prepared for example from reactants comprising a diol, a monoanhydride or a diacid, and a diepoxy compound, wherein the mole ratio of diol, monoanhydride (or diacid), and diepoxy compounds in the epoxy-adduct may vary from 0.5:0.8:1.0 to 0.5:1.0:6.0.

Further, according to the present invention, the epoxy-adduct can also be prepared for example with reactants comprising a tetraol, a monoanhydride or a diacid, and a diepoxy compound, wherein the mole ratio of tetraol, monoanhydride (or diacid), and diepoxy compounds in the epoxy-adduct may vary from 0.5:0.8:1.0 to 0.5:1.0:6.0.

It is appreciated that the epoxy functional polymers, such as the epoxy-adducts, can include additional functional groups as well. The additional functional groups can include any of the functional groups previously described such as hydroxyl groups. The epoxy functional polymers can also include aromatic groups, aliphatic cyclic groups, or combinations thereof. For example, the adhesion promoter can include a lactone based polyester comprising epoxy functional groups, hydroxyl functional groups, aromatic groups, and aliphatic cyclic groups.

The adhesion promoter can also comprise epoxy functional polymers mixed with rubber particles such as core-shell rubber particles dispersed in liquid epoxy resins for example. Suitable core-shell rubber particles may be comprised of butadiene rubber or other synthetic rubbers, such as styrene-butadiene and acrylonitrile-butadiene and the like. The average particle size of the rubber particles may be from 0.02 to 500 microns (20 nm to 500,000 nm), for example, the reported particle size for rubber particles provided by Kanekea Texas Corporation, as measured by standard techniques known in the industry, such as, for example, according to ISO 13320 and ISO 22412.

Exemplary non-limiting commercial core-shell rubber particle products using poly(butadiene) rubber particles that may be utilized include a core-shell poly(butadiene) rubber dispersion (25% rubber by weight) in bisphenol F diglycidyl ether (commercially available as KANE ACE® MX 136), a core-shell poly(butadiene) rubber dispersion (33% rubber by weight) in EPON® 828 (commercially available as KANE ACE® MX 153), a core-shell poly(butadiene) rubber dispersion (37% rubber by weight) in bisphenol A diglycidyl ether (commercially available as KANE ACE® MX 257), and a core-shell poly(butadiene) rubber dispersion (37% rubber by weight) in bisphenol F diglycidyl ether (commercially available as KANE ACE® MX 267), each available from Kaneka Texas Corporation. The rubber particles that are part of the adhesion promoter, such as the core-shell rubbers particles, can therefore be dispersed in a non-aqueous liquid medium.

Exemplary non-limiting commercial core-shell rubber particle products using styrene-butadiene rubber particles that may be utilized in the first component include a core-shell styrene-butadiene rubber dispersion (33% rubber by weight) in low viscosity bisphenol A diglycidyl ether (commercially available as KANE ACE® MX 113), a core-shell styrene-butadiene rubber dispersion (25% rubber by weight) in bisphenol A diglycidyl ether (commercially available as Kane Ace MX 125), a core-shell styrene-butadiene rubber dispersion (25% rubber by weight) in D.E.N.TM-438 phenolic novolac epoxy (commercially available as KANE ACE® MX 215), a core-shell styrene-butadiene rubber dispersion (25% rubber by weight) in Araldite® MY-721 multi-functional epoxy (commercially available as KANE ACE® MX 416), a core-shell styrene-butadiene rubber dispersion (25% rubber by weight) in MY-0510 multi-functional epoxy (commercially available as KANE ACE® MX 451), a core-shell styrene-butadiene rubber dispersion (25% rubber by weight) in Syna Epoxy 21 Cyclo-aliphatic Epoxy from Synasia (commercially available as Kane Ace MX 551), and a core-shell styrene-butadiene rubber dispersion (25% rubber by weight) in polypropylene glycol (MW 400) (commercially available as KANE ACE® MX 715), each available from Kaneka Texas Corporation. The rubber particles that are part of the adhesion promoter, such as the core-shell rubbers particles, can therefore be dispersed in a non-aqueous liquid medium.

It is appreciated that the adhesion promoter of the present invention can include one or multiple polymers that independently comprise two or more epoxy functional groups per molecule and which are the same or different from each other. For instance, the adhesion promoter can comprise at least one, at least two, or all three of the following: (1) a polymer, such as a polyester, comprising two epoxy functional groups per molecule and, optionally, hydroxyl functional groups, aromatic groups, and aliphatic cyclic groups; (2) a polymer, such as a polyester, comprising greater than two epoxy functional groups per molecule such as at least four epoxy functional groups per molecule and, optionally, hydroxyl functional groups, aromatic groups, and aliphatic cyclic groups; and (3) core shell rubber particles dispersed in an epoxy resin, such as an epoxy resin based on bisphenol-A. Thus, the adhesion promoter can comprise: only one of (1), (2), or (3); a combination of (1) and (2), (1) and (3), or (2) and (3); or a combination of all of (1), (2), and (3).

As indicated, the at least one epoxy-functional polymer is combined with a thiol functional crosslinker reactive with the epoxy functional groups for use as an adhesion promoter according to the present invention. As used herein, the term "crosslinker" refers to a molecule comprising two or more functional groups that are reactive with other functional groups and which is capable of linking two or more monomers or polymer molecules through chemical bonds. The thiol functional crosslinker comprises a compound having two or more thiol functional groups such as at least three thiol functional groups or at least four thiol functional groups. The at least one epoxy-functional polymer and the thiol functional crosslinker can be dispersed in a separate aqueous medium before being mixed with the additional components of the coating composition.

Non-limiting examples of a dithiol functional crosslinker include 3,6-dioxa-1,8-octanedithiol (DMDO), 3-oxa-1,5-pentanedithiol, 1,2-ethanedithiol, 1,3-propanedithiol, 1,2-propanedithiol, 1,4-butanedithiol, 1,3-butanedithiol, 2,3-butanedithiol, 1,5-pentanedithiol, 1,3-pentanedithiol, 1,6-hexanedithiol, 1,3-dithio-3-methylbutane, ethylcyclohexyldithiol (ECHDT), methylcyclohexyldithiol, methyl-substituted dimercaptodiethyl sulfide, dimethyl-substituted dimercaptodiethyl sulfide, 2,3-dimercapto-1-propanol, bis-(4-mercaptomethylphenyl) ether, 2,2'-thiodiethanethiol, and glycol dimercaptoacetate (commercially available as THIOCURE® GDMA from BRUNO BOCK Chemische Fabrik GmbH & Co. KG).

Non-limiting examples of a trithiol functional crosslinker include trimethylpropane trimercaptoacetate (commercially available as THIOCURE® TMPMA from BRUNO BOCK Chemische Fabrik GmbH & Co. KG), trimethylopropane tris-3-mercaptopropionate (commercially available as THIOCURE® TMPMP from BRUNO BOCK Chemische Fabrik GmbH & Co. KG), ethoxylated trimethylpropane tris-3-mercaptopropionate polymer (commercially available as THIOCURE® ETTMP from BRUNO BOCK Chemische Fabrik GmbH & Co. KG), and tris[2-(3-mercaptopropionyloxy)ethyl]isocyanurate (commercially available as THIOCURE® TEMPIC from BRUNO BOCK Chemische Fabrik GmbH & Co. KG).

Non-limiting examples of a tetrathiol functional crosslinker includes pentaerythritol tetramercaptoacetate (commercially available as THIOCURE® PETMA from BRUNO BOCK Chemische Fabrik GmbH & Co. KG), pentaerythritol tetra-3-mercaptopropionate (commercially available as THIOCURE® PETMP from BRUNO BOCK Chemische Fabrik GmbH & Co. KG), and polycaprolactone tetra(3-mercaptopropionate) (commercially available as THIOCURE® PCL4MP 1350 from BRUNO BOCK Chemische Fabrik GmbH & Co. KG). Higher functional polythiol crosslinkers may include dipentaerythritol hexa-3-mercaptopropionate (commercially available as THIOCURE® DiPETMP from BRUNO BOCK Chemische Fabrik GmbH & Co. KG).

The thiol functional crosslinker that can be used to form an adhesion promoter according to the present invention may also comprise a mercaptan terminated polysulfide. Commercially available mercaptan terminated polysulfides includes those sold under the trade name THIOLKOL® LP from Torray Fine Chemicals Co., Ltd., including LP-3, LP-33, LP-23, LP-980, LP-2, LP-32, LP-12, LP-31, LP-55 and LP-56. Other commercially available mercaptan terminated polysulfides include those sold under the trade name THIOPLAST® G™ from AkzoNobel Functional Chemicals GmbH, including G 10, G 112, G 131, G 1, G 12, G 21, G 22, G 44 and G 4.

According to the present invention the thiol functional crosslinker may also comprise a mercaptan terminated polyether. Commercially available mercaptan terminated polyether include for example QE-340M available from Torray Fine Chemicals Co., Ltd.

The epoxy functional polymer(s) and the thiol functional crosslinker(s) can be combined, e.g. mixed together, to provide a desired equivalent ratio of epoxy functional groups to thiol functional groups. For example, the epoxy functional polymer(s) and the thiol functional crosslinker(s) can be combined in suitable amounts to provide an equivalent ratio of epoxy functional groups to thiol functional groups in a range of from 0.03:1 to 2:1, such as from 0.1:1 to 1.5:1, or from 0.6:1 to 1.2:1, or from 0.8:1 to 1.2:1, or from 0.9:1 to 1.1:1 or being about 1.1:1.

As previously described, the adhesion promoter can also comprise, alternatively to or in addition to the epoxy functional polymer(s) and the thiol functional crosslinker(s), a hydrazide functional component. The hydrazide component used with the present invention typically comprises a material or compound having two or more hydrazide functional groups per molecule. The hydrazide component can be chosen from non-polymeric polyhydrazides, polymeric polyhydrazides, or combinations thereof. Non-limiting examples of suitable non-polymeric polyhydrazides include maleic acid dihydrazide, fumaric acid dihydrazide, itaconic acid dihydrazide, phthalic acid dihydrazide, isophthalic acid dihydrazide, terephthalic acid dihydrazide, trimellitic acid trihydrazide, oxalic acid dihydrazide, adipic acid dihydrazide, sebacic acid dihydrazide, and combinations thereof.

The polymeric polyhydrazides can include various types of polymers comprising two or more hydrazide functional groups. For example, the polymeric polyhydrazide can comprise a polyurethane having two or more hydrazide groups. The polyhydrazide functional polyurethane can be prepared by first forming a water-dispersible isocyanate functional polyurethane prepolymer. Such water-dispersible isocyanate functional polyurethane prepolymers can be prepared by reacting polyols, isocyanates, compounds containing carboxylic acids such as diols containing carboxylic acids and, optionally, polyamines. Non-limiting examples of these compounds include any of those previously described.

It is appreciated that the isocyanate functional polyurethane prepolymer used to prepare the polyhydrazide functional polyurethane can include additional functional groups. For instance, the isocyanate functional polyurethane prepolymer can also include any of the reactive functional groups previously described such as carboxylic acid groups that can be at least partially neutralized by an inorganic base to form a salt group and enhance the water-dispersibility/stability of the polyurethane. The polyurethane prepolymer can also be free of certain additional functional groups (e.g., free of keto and aldo functional groups) and can only include hydrazide functional groups and, optionally, carboxylic acid functional groups or other water-dispersible groups. Further, the isocyanate functional polyurethane prepolymer can include additional linkages other than urethanes including, but not limited to, ether linkages, ester linkages, urea linkages, and any combination thereof.

After forming the water-dispersible isocyanate functional polyurethane prepolymer, the polyurethane prepolymer is reacted with hydrazine and/or a polyhydrazide compound to form a water-dispersible polyhydrazide functional polyurethane. The polyhydrazide compounds can also chain extend the isocyanate functional polyurethane prepolymer. Non-limiting examples of polyhydrazide compounds that can be reacted with the isocyanate functional polyurethane prepolymer include for example any of the non-polymeric hydrazide functional compounds previously described.

The polymeric polyhydrazides can also include core-shell particles comprising a polymeric core at least partially encapsulated by a polymeric shell having two or more hydrazide functional groups. The polymeric shell is typically covalently bonded to at least a portion of the polymeric core. For example, the polymeric shell can be covalently bonded to the polymeric core by reacting at least one functional group on the monomers and/or prepolymers that are used to form the polymeric shell with at least one functional group of the monomers and/or prepolymers that are used to form the polymeric core.

The polyhydrazide functional core-shell particles can be prepared with the various components and methods previously described and in which further uses a hydrazide functional material to provide the hydrazide functional groups. For example, the polyhydrazide functional core-shell particles can be prepared by reacting polyurethane prepolymers having isocyanate and ethylenically unsaturated functional groups with hydrazine and/or polyhydrazide compounds and ethylenically unsaturated monomers and/or polymers. In some examples, the polyhydrazide functional core-shell particles are prepared by reacting polyurethane prepolymers having isocyanate and ethylenically unsaturated groups with hydrazine and/or polyhydrazide compounds to form polyurethanes having hydrazide and ethylenically unsaturated groups. The polyurethanes having hydrazide and ethylenically unsaturated groups are then polymerized in the presence of ethylenically unsaturated monomers and/or polymers to form the core-shell particles. The resulting core-shell particles will comprise a polymeric core prepared from ethylenically unsaturated monomers and/or polymers that are covalently bonded to at least a portion of a polyurethane shell having hydrazide functional groups and urethane linkages. The polymeric shell can also comprise additional functional groups (for example, carboxylic acid functional groups) and/or linkages (for example, ester linkages and/or ether linkages) as previously described with respect to polyurethane shells. The hydrazide functional core-shell particles can be also free of additional functional groups and linkages such as any of those previously described herein. It is appreciated that the hydrazide functional core-shell particles are free of keto and aldo functional groups.

The polymeric hydrazides of the present invention (the linear or branched polymeric hydrazides as well as the polymeric hydrazide core-shell particles) can be dispersed in a separate aqueous medium before being combined, e.g. mixed, with the additional components of the coating composition. Thus, a non-polymeric hydrazide, a linear or branched polymeric hydrazide, a polymeric hydrazide functional core-shell particle, or any combination thereof can be dispersed in an aqueous medium to form a separate latex before being mixed with the additional components of the coating composition according to the present invention.

As previously described, the adhesion promoter can comprise (a) the at least one epoxy functional polymer and the thiol functional crosslinker, (b) the hydrazide functional component, or (c) a combination of (a) and (b). As such, the adhesion promoter can comprise any combination of the polymers previously described for (a) and (b). It was surprisingly found that coatings formed from the coating composition comprising a combination of both (a) and (b) exhibited superior adhesion to a substrate as compared to coatings formed from the elastic barrier composition comprising (a) or (b) alone.

When the adhesion promoter comprises the at least one epoxy functional polymer and the thiol functional crosslinker, the adhesion promoter can be used in the coating composition according to the present invention an amount such that the at least one epoxy functional polymer and thiol functional crosslinker comprises at least 2 weight %, such as at least 3 weight %, at least 5 weight %, at least 10 weight %, at least 15 weight %, at least 20 weight %, at least 30 weight %, or at least 40 weight % of the coating composition, based on the total solids weight of the coating composition. The at least one epoxy functional polymer and thiol functional crosslinker can comprise up to 70 weight %, up to 60 weight %, up to 50 weight %, up to 40 weight %, up to 30 weight %, up to 20 weight %, up to 15 weight %, up to 12 weight %, or up to 10 weight % of the coating composition, based on the total solids weight of the coating composition. The at least one epoxy functional polymer and thiol functional crosslinker can for example be comprised in the coating composition in an amount in a range of from 2 to 70 weight %, from 2 to 60 weight %, 20 to 60 weight %, 30 to 60 weight %, 30 to 50 weight %, 2 to 40 weight %, or from 3 to 30 weight %, or from 3 to 25 weight % of the coating composition, based on the total solids weight of the coating composition.

When the adhesion promoter comprises the hydrazide functional component, the adhesion promoter can used in the coating composition according to the present invention in an amount such that the hydrazide functional component comprises at least 1 weight %, at least 2 weight %, or at least 3 weight % of the coating composition, based on the total solids weight of the coating composition. The hydrazide functional component can comprise up to 15 weight %, up to 10 weight %, or up to 5 weight % of the coating composition, based on the total solids weight of the coating composition. The hydrazide functional component can for example comprise a range such as from 1 to 15 weight %, or from 2 to 20 weight %, or from 3 to 6 weight % of the coating composition, based on the total solids weight of the coating composition.

It is appreciated that when the adhesion promoter comprises both (a) the combination of at least one epoxy functional polymer and the thiol functional crosslinker and (b) the hydrazide functional component, the coating composition can include any combination of the previously described amounts of both (a) and (b). For example, when the adhesion promoter comprises both (a) and (b), the coating composition can comprise from 2 to 15 weight % of the epoxy functional polymer and thiol crosslinker, and from 1 to 10 weight % of the hydrazide functional component, based on the total solids weight of the coating composition.

The coating composition according to the present invention can optionally include additional polymers. Non-limiting examples of additional polymers include polyesters, polyethers, polysulfides, or combinations thereof. For instance, the coating composition can include a polyester.

The polymers that form the coating composition of the present invention can have functional groups that are reactive with each other or with themselves such that the polymers are self-crosslinking. The coating composition can optionally include additional crosslinkers other than the thiol functional crosslinker mentioned above. Non-limiting examples of such crosslinkers that can optionally be used with the compositions described herein include carbodiimides, polyhydrazides, aziridines, epoxy resins, alkylated carbamate resins, (meth)acrylates, isocyanates, blocked isocyanates, polyacids, polyamines, polyamides, aminoplasts, melamines, hydroxyalkyl ureas, hydroxyalkyl amides, and any combination thereof. It is appreciated that the coating composition can include a single type or multiple types of crosslinkers.

The crosslinkers used with the elastic barrier compositions described herein are reactive with the core-shell particles, polythioether, the adhesion promoter, if present the additional polymer(s), or any combination thereof. For example, the coating compositions can comprise: (i) a thiol functional crosslinker reactive with the epoxy functional adhesion promoter; and (ii) a carbodiimide that is reactive with the carboxylic acid functional groups of the core-shell particles having barrier and elastomeric segments. Non-limiting examples of suitable polycarbodiimides are described in U.S. Patent No. 2011/0070374, which is incorporated by reference herein in its entirety.

The coating composition can also comprise one or more additional crosslinker(s) that can be used to help maintain the desired properties of the final coatings. For example, the additional crosslinker(s) can be added to stop the softening of the final coating at high temperatures (e.g. above 100° C.). Non-limiting examples of such crosslinker(s) include melamines, hydroxyalkyl ureas, hydroxyalkyl amides, blocked isocyanates, and combinations thereof. These crosslinker(s) can be reactive with the core-shell particles having barrier and elastomeric segments, polythioether, the adhesion promoter, if present the additional polymer(s), or any combination thereof.

The coating compositions according to the present invention can further optionally include a platy inorganic filler. As used herein, a "platy inorganic filler" refers to an inorganic material in a platy form. The term "platy" refers to a structure in which one dimension is substantially smaller than the two other dimensions of the structure resulting in a flat type appearance. The platy inorganic fillers are generally in the form of stacked lamellae, sheets, platelets, flakes, or plates with a relatively pronounced anisometry. The platy inorganic filler(s) can further improve the barrier performance of the resulting coating by reducing the permeability of liquids and gases.

Suitable platy inorganic fillers can include those having a high aspect ratio, such as for example, vermiculite, mica, talc, wollastonite, chlorite, metal flakes, platy clays, and platy silicas. Such fillers typically have diameters of 1 to 20 μm (microns), 2 to 5 μm (microns), or 2 to 10 μm (microns). The aspect ratio of the fillers can be at least 5:1, such as at least 10:1 or 20:1. For example, mica flakes may have an aspect ratio of 20:1 or more, talc may have an aspect ratio of 10:1 to 20:1, and vermiculite may have an aspect ratio of from 200:1 to 10,000:1.

The coating compositions of the present invention can include other optional materials as well. For example, the coating compositions can also comprise a colorant. As used herein, "colorant" refers to any substance that imparts color and/or other opacity and/or other visual effect to the composition. The colorant can be added to the coating in any suitable form, such as discrete particles, dispersions, solutions, and/or flakes. A single colorant or a mixture of two or more colorants can be used in the coatings of the present invention.

Example colorants include pigments (organic or inorganic), dyes, and tints, such as those used in the paint industry and/or listed in the Dry Color Manufacturers Association (DCMA), as well as special effect compositions. A colorant may include, for example, a finely divided solid powder that is insoluble, but wettable, under the conditions of use. A colorant can be organic or inorganic and can be agglomerated or non-agglomerated. Colorants can be incorporated into the coatings by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, diazo, naphthol AS, salt type (flakes), benzimidazolone, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, and mixtures or combinations thereof. The terms "pigment" and "colored filler" can be used interchangeably.

Example dyes include, but are not limited to, those that are solvent and/or aqueous based such as phthalo green or blue, iron oxide, bismuth vanadate, and mixtures or combinations thereof.

Example tints include, but are not limited to, pigments dispersed in water-based or water-miscible carriers such as AQUA-CHEM 896 commercially available from Degussa, Inc., CHARISMA COLORANTS and MAXITONER INDUSTRIAL COLORANTS commercially available from Accurate Dispersions Division of Eastman Chemical, Inc.

Other non-limiting examples of materials that can optionally be used with the coating compositions of the present invention include plasticizers, abrasion resistant particles, corrosion resistant particles, corrosion inhibiting additives, anti-oxidants, hindered amine light stabilizers, UV light absorbers and stabilizers, surfactants, flow and surface control agents, thixotropic agents, organic cosolvents, catalysts, reaction inhibitors, and other customary auxiliaries.

The coating compositions of the present invention can be prepared by mixing the core-shell particles having barrier and elastomeric segments, polythioether, adhesion promoter, and, optionally, any of the other previously described components. As indicated above, the previously described components can be formed as separate dispersions. As such, the previously described components can first be prepared as separate dispersions and then combined along with the other optional components, if used, to form the coating compositions of the present invention. Alternatively, two or more of the previously described components can be dispersed together in the same aqueous medium before being combined with the remaining components of the coating composition.

After forming the coating compositions of the present invention, the compositions can be applied to a wide range of substrates known in the coatings industry. For example, the coating compositions of the present invention can be applied to automotive substrates, industrial substrates, aircraft and aircraft components, marine substrates and components such as ships, vessels, and on-shore and off-shore installations, storage tanks, windmills, nuclear plants, packaging substrates, wood flooring and furniture, apparel, electronics, including housings and circuit boards, glass and transparencies, sports equipment, including golf balls, stadiums, buildings, bridges, and the like. The substrates can be, for example, metallic or non-metallic. Metallic substrates include, but are not limited to, tin, steel (including electrogalvanized steel, cold rolled steel, hot-dipped galvanized steel, among others), aluminum, aluminum alloys, zinc-aluminum alloys, steel coated with a zinc-aluminum alloy, and aluminum plated steel. Non-metallic substrates include polymeric, plastic, polyester, polyolefin, polyamide, cellulosic, polystyrene, polyacrylic, poly(ethylene naphthalate), polypropylene, polyethylene, nylon, EVOH, polylactic acid, other "green" polymeric substrates, poly(ethyleneterephthalate) (PET), polycarbonate, polycarbonate acrylobutadiene styrene (PC/ABS), polyamide, wood, veneer, wood composite, particle board, medium density fiberboard, cement, stone, glass, paper, cardboard, textiles, leather both synthetic and natural, and the like.

Specific non-limiting examples of suitable substrates include athletic balls, such as soccer balls, basketballs, volleyballs, footballs, racquet balls, squash balls, beach balls, tennis balls, golf balls, baseballs, and the like; inflatable rafts, furniture, toys, and the like; air mattresses, air bags, air shocks, bladders, emergency slides, life vests, medical equipment and devices, such as blood pressure bags, catheters, and the like; tires such as the outer portion of the tire, the inner liner of the tire, and/or to tires as part of a repair coating to repair a portion of the tire, where the tires can include bike tires, automobile tires, bike tubes, ultra-terrain bike tires, motorcycle tires, lawn tractor tires, and the like; balloons, air bladders, or other footwear applications, packaging material, such as bottles, wraps, food, or plastic sheets, hoses, garbage bags, plastic light bulbs, fire extinguishers, LED displays, plasma TV's, parachutes, scuba tanks, gas cylinders, flexible foam, rigid foam, other pipes, hoses, tubes, and the like; architectural needs, such as windows, roofing, siding, and the like; fiber optic cables, seals and gaskets, batteries, clothing and other textiles, swimming pool liners and covers, hot tubs, tanks, electronics, buckets, and pails.

The coating compositions of the present invention are particularly useful when applied to elastomeric substrates that exhibit a degree of elasticity. Examples of such substrates include, but are not limited, thermoplastic urethane, synthetic leather, natural leather, finished natural leather, finished synthetic leather, ethylene vinyl acetate foam, polyolefins and polyolefin blends, polyvinyl acetate and copolymers, polyvinyl chloride and copolymers, urethane elastomers, synthetic textiles, natural textiles, rubbers, and combinations thereof. The substrates can also include those that have gas permeability such as substrates comprising polymers, including but not limited to, polyesters, polyolefins, polyamides, cellulosics, polystyrenes, polyacrylics, and polycarbonates. Poly(ethylene terephthalate), poly(ethylene naphthalate), and combinations thereof. It is appreciated that the substrates can include gas permeable elastomeric materials.

It was found that the coating compositions provided herein can be applied to a substrate and cured to form elastic gas barrier coatings that provide both low temperature elasticity and good oxygen/nitrogen gas barrier performance. For example, coatings deposited from the elastic gas barrier coating compositions described herein have been found to exhibit an elasticity of at least 25% at temperatures as low as −40° C. The coatings also exhibit an elasticity of at least 100% at temperatures around room temperature (20° C. to 25° C.) and higher. The coatings can also exhibit good storage modulus at low temperatures. The elastic gas barrier coatings further exhibit good oxygen permeance at temperatures from −40° C. to 225° C., such as an oxygen permeance of less than 100 80 cc·mm/m$^2$·day·atm, or 80 cc·mm/m$^2$·day·atm or less at 23° C. and 50% relative humidity. The elasticity is determined by measuring the elongation at break as previously described.

To increase adhesion of a coating to a substrate, the substrate can be chemically and/or mechanically treated prior to applying a coating composition or film described herein. For instance, the surface of the substrate can be roughened, treated with steam, treated with a chemical solution, or heated prior to applying a coating composition or film. Any combination of these treatment methods can be used together to improve adhesion of a coating to the substrate.

The process of roughening the surface of a substrate can comprise abrading or scuffing the surface of the substrate such that the texture of the surface is adjusted to include increased or additional vertical deviations. The surface of the substrate can be roughened using various methods including, but not limited to, sandblasting, scrubbing with sandpaper, or a combination thereof. As used herein, "sandblasting" refers to a process of spraying sand, or fine particles of other materials such as gravel, over the surface of a substrate. Sandblasting can use compressed-air to spray the sand or other fine particulate materials at a pressure and speed sufficient to roughen the surface of the substrate.

As indicated, the surface of the substrate can also be treated with steam and/or a chemical solution. As used herein, "steam" refers to a vapor or mist formed from water, and a "chemical solution" refers to a liquid mixture of two or more substances. Non-limiting examples of chemical solutions that can be used to treat the surface of the substrate include solutions comprising chlorinated compounds. Examples of suitable chlorinated compounds include, but are not limited to, hypochlorite, trichloroisocyanuric acid, and combinations thereof. A commercially available chemical solution includes Clorox Clean-Up® from the Clorox Company. The steam and/or chemical solution can be applied to the surface of the substrate to remove contaminates and other objects.

Further, the substrate or the surface of the substrate that is to be coated can be heated to further increase adhesion of a coating. For example, the substrate or surface of the substrate can be heated to a temperature of 100° C. to 300° C., or from 120° C. to 280° C., or from 150° C. to 250° C. The substrate or surface of the substrate can be heated with convective heat, electromagnetic radiation such as infrared radiation, or a combination thereof. "Convective heat" refers to a heat transfer in a gas, and "electromagnetic radiation" refers to radiant energy released by electromagnetic processes. Electromagnetic radiation includes radio waves, microwaves, infrared and near-infrared radiation, visible light, and ultraviolet radiation.

As noted above, the surface of a substrate can be treated with any combination of the previously described treatment methods. For instance, the surface of a substrate can be sandblasted, treated with steam and a hypochlorite chemical solution, and then heated to a temperature of 100° C. to 300° C. prior to applying a coating composition.

The coating compositions of the present invention can be applied to the substrate by various means known in the art including, but not limited to, spraying, dipping, brushing, rolling, and the like. Further, the coating compositions can be applied to a substrate using various devices. For instance, when applied to the inner liner of a tire, the coating compositions can be spray applied using devices that secure and rotate the tire during application.

After the coating compositions are applied to a substrate, the compositions can be dried and/or cured at ambient conditions, with heat, or with other means such as actinic radiation to form a coating. As used herein, the terms "curable", "cure", and the like mean that at least a portion of the resinous materials in a composition is crosslinked or crosslinkable. Further, "ambient conditions" refers to the conditions of the surrounding environment (e.g., room temperature of 20° C. to 25° C.). The term "actinic radiation" refers to electromagnetic radiation that can initiate chemical reactions. Actinic radiation includes, but is not limited to, visible light, ultraviolet (UV) light, X-rays, and gamma radiation.

The coating composition of the present invention can also be at least partially applied to an elastomeric substrate and co-molded or co-vulcanized therewith. "Co-vulcanization" and like terms refer to the process of chemically producing crosslinks or bonds between the elastomeric materials in the coating composition and the substrate. When a crosslinker is used with the coating composition, it will be appreciated that two "crosslinking" mechanisms occur—one between the elastomeric materials in the coating composition and the substrate, and one between the functional groups on the polymeric materials and the crosslinker(s) used in the coating composition.

In addition, the coating composition can also be applied to a substrate as a dehydrated film and then formed into the final coating. For example, the coating composition of the present invention can be applied to a first substrate and then dried such that substantially all water in the coating composition is evaporated to thereby form an elastic barrier film. The first substrate can include any of those previously described provided that the dehydrated film does not form bonds with the substrate. The coating composition can also be applied to the first substrate using any technique known in the art such as spraying for example.

As indicated, substantially all water in the coating composition is evaporated after being applied to the first substrate. As used herein, "substantially all water" refers to at least 90 weight % of all water in the coating composition. The water can be evaporated at ambient conditions or by applying heat. In some examples, substantially all water in the coating composition is evaporated by heating the coating composition at temperature of 25° C. to 150° C.

After forming an elastic barrier film by evaporating substantially all water from the coating composition, the film can be removed from the first substrate and applied to a second substrate. The second substrate can include any of the substrates previously described. The elastic barrier film may then be cured and/or further dried to form the final coating over the substrate. The film can be cured and/or dried by: (i) applying actinic radiation to the applied film; (ii) applying convective heat to the applied film; (iii) applying the elastic barrier film to the second substrate while the second substrate is heated above ambient temperatures; or a combination thereof.

Alternatively, the film is cured and/or dried by maintaining the film on the second substrate at ambient conditions for a time sufficient to allow the curing and/or drying of the elastic barrier film. As used herein, a "time sufficient", with respect to the curing and/or drying of the elastic barrier film, refers to a period of time necessary to remove any remaining solvents and form the final coating such as with a crosslinking process.

It was found that the formation and application of a preformed film provides a more continuous coating over the final substrate. The elastic barrier film also allows for easy storage, transportation, and application of the film prior to formation of the final coating.

The coating formed over the final substrate according to any of the methods previously described will typically have a dry film thickness of 2.54 µm to 2.03 mm (0.1 to 80 mils), such as 12.7 µm to 1.27 mm (0.5 to 50 mils) or 0.25 mm to 0.76 mm (10 to 30 mils).

The coating compositions described herein can be applied to a substrate to form a monocoat. As used herein, a "monocoat" refers to a single layer coating system that is free of additional coating layers. Thus, the coating composition can be applied directly to a substrate and dehydrated or cured to form a single layer coating, i.e. a monocoat.

Alternatively, the coating compositions according to the present invention can be applied to a substrate along with additional coating layers to form a multi-layer coating. For example, the elastic barrier coatings described herein can be applied directly over a substrate or over a primer layer as a basecoat layer and additional coating layers can be applied over the basecoat as a topcoat. The elastic barrier coatings can also be applied over a basecoat as a topcoat. As used herein, a "primer" refers to a coating composition from which an undercoating may be deposited onto a substrate in order to prepare the surface for application of a protective or decorative coating system. A "basecoat" refers to a coating composition from which a coating is deposited onto a primer and/or directly onto a substrate, optionally including components (such as pigments) that impact the color and/or provide other visual impact. A "topcoat" refers to the uppermost layer of a multi-layer system that includes that can provide a protective and/or decorative layer.

Further, each coating composition can be applied as a dry-on-dry process where each coating composition is dried or cured to form a coating layer prior to application of another composition coating. Alternatively, all or certain combinations of each coating composition described herein can be applied as a wet-on-wet process and dried or cured together.

For purposes of the present detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise. For example, "a" polymer, "a" polythioether, "a" core-shell particle, and the like refer to one or more of any of these items.

The following examples are presented to demonstrate the general principles of the invention. The invention should not be considered as limited to the specific examples presented. All parts and percentages in the examples are by weight unless otherwise indicated.

Further, various measurements in the Examples were determined as follows. Brookfield viscosities were measured at 25° C. on a Brookfield Viscometer DV-II+Pro using spindle #2 at 60 RPM. Gardner-Holdt viscosity was determined according to ASTM D1545-13. Acid values and hydroxyl values were determined using a Metrohm 798 MPT Titrino automatic titrator according to ASTM D 4662-15 and ASTM E 1899-16. Non-volatile contents (also referred to as "solids content" and "solids weight") were measured by comparing initial sample weights to sample weights after exposure to 110° C. for 1 hour. Epoxy equivalent weights were determined by titration with 0.1 N perchloric acid in glacial acetic acid as the titration reagent and a Metrohm 888 Titrando titrator according to ASTM D1652-11e1.

Moreover, weight and number average molecular weight of polymeric samples were measured by gel permeation chromatography relative to linear polystyrene standards of 800 to 900,000 Da. Gel permeation chromatography was performed using a Waters 2695 separation module with a Waters 2414 differential refractometer (RI detector). Tetrahydrofuran (THF) was used as the eluent at a flow rate of 1 ml min-1. Two PLgel Mixed-C (300×7.5 mm) columns were used for separation.

Example 1

Preparation of a Polyester

Part A: A polyester prepolymer was first prepared from the components listed in Table 1.

TABLE 1

| Component | Amount (grams) |
|---|---|
| Diethylene glycol | 1140.9 |
| Succinic anhydride | 1128.0 |
| Butyl stannoic acid | 10.63 |

The components listed in Table 1 were charged in a four-neck round bottom flask equipped with an electronic temperature probe, mechanical stirrer, condenser, dry nitrogen sparge, and a heating mantle. The temperature was gradually increased to 210° C. over an eight hour period while stirring, sparging with nitrogen, and collecting the distillate. The reaction temperature was then held at 210° C. for 10 hours until the acid value dropped to 3.1 and 335 ml of distillate was collected.

The final product was a dark orange liquid with a Gardner-Holdt viscosity of Z6+, a hydroxyl value of 72.6, a number average molecular weight ($M_N$) of 1636 g/mol, a weight average molecular weight ($M_W$) of 4127 g/mol, and nonvolatile content of 98.4%.

Example 2

Preparation of a Polyurethane-Acrylic Core-Shell Dispersion

A polyurethane-acrylic core-shell dispersion was prepared from the components listed in Table 2.

TABLE 2

| Component | Amount (grams) |
|---|---|
| Charge A | |
| Polyester prepolymer of Example 1 | 1339.7 |
| Dimethylolpropionic acid | 201.0 |
| Hydroxyethyl methacrylate | 36.3 |
| 1,3-bis(2-hydroxyethoxy) benzene | 502.4 |
| Butylated hydroxytoluene | 3.35 |
| Charge B | |
| Butyl acrylate | 807.9 |
| Ethylene glycol dimethacrylate | 12.6 |
| Charge C | |
| Toluene diisocyanate | 1157.2 |
| Charge D | |
| Butyl acrylate | 115.7 |
| Charge E | |
| Water | 4395.7 |
| Dimethylethanolamine | 98.3 |
| Ethylenediamine | 76.2 |
| Diethanolamine | 27.0 |
| FOAMASTER ® MO 2111 [1] | 7.70 |
| Charge F | |
| Water | 77.1 |
| t-Butyl hydroperoxide | 3.85 |
| Charge G | |
| Water | 533.4 |
| Ferrous ammonium sulfate | 0.039 |
| Sodium metabisulfite | 3.42 |
| Dimethylethanolamine | 2.4 |
| Charge H | |
| Water | 15.9 |
| PROXEL ® GXL [2] | 8.0 |

[1] A defoamer, commercially available from BASF Corporation.
[2] A preservative, commercially available from Arch Chemicals.

Charge A was added to a four-neck round bottom flask equipped with an electronic temperature probe, mechanical stirrer, condenser, nitrogen atmosphere, and a heating mantle. Charge A was stiffed at 110° C. for 30 minutes then cooled to 35° C. Charge B was then added and the mixture was adjusted to 91° C. One third of charge C was added over 30 minutes and the mixture was cooled to 40° C. The remainder of Charge C was then added over twenty minutes. Charge D was used to rinse the addition funnel used for charge C. The reaction mixture was held at 85° C. for 90 minutes.

Charge E was heated in a separate 12 liter four-neck flask under a nitrogen atmosphere to 50° C. Next, 3,751 g of the reaction product of charges A, B, C, and D were added to charge E over a 20 minute period. The mixture was cooled to 45° C. and a nitrogen atmosphere was established and maintained in the flask for the remainder of the reaction. Charge F was added to the reaction flask followed by a 30 minute addition of charge G. The temperature rose exothermically to 60° C. Charge H was then added. The final dispersion had a Brookfield viscosity of 225 centipoise, an acid value of 8.8, a pH of 7.52, and a nonvolatile content of 43.2%.

Example 3

Preparation of Polyester

A polyester was prepared according to Example A1 of EP 1,454,971 B1 as follows: In a reactor equipped with a stirrer, a water separator and a control unit for the temperature, the following components were mixed and heated to 185° C.: 1732 grams of TERATHANE® (polytetramethylene ether glycol having a number average molecular weight of 650 g/mol, commercially available from DuPont), and 307 grams of trimellitic anhydride. Upon reaching a carboxyl group content of 0.713 mmol/g (acid number=40 mg KOH/g), the reaction temperature is lowered to 175° C. The reaction is continued until reaching a carboxyl group content of 0.535 mmol/g (acid number=30 mg KOH/g). The Gardner-Holdt viscosity of the resin solution at 60% strength in butoxyethanol was V. After cooling, the polyester melt to 85° C., 552 grams of a 10% aqueous dimethylethanolamine solution was added followed by 2390 grams of deionized water. A finely divided dispersion was formed having a nonvolatile content of 40% and an acid number of 29 mg KOH/g.

Example 4

Preparation of a Hydrazide Functional Polyurethane

Part A: An isocyanate functional polyurethane was first prepared by charging the following components into a four necked round bottom flask fitted with a thermocouple, mechanical stirrer, and condenser: 209 grams of methylethyl ketone (MEK), 497.7 grams of FOMREZ® 66-56 (hydroxyl terminated saturated linear polyester polyol, commercially available from Chemtura), 75 grams of dimethylol propionic acid (DMPA), and 3.6 grams of triethylamine. The mixture was heated to 50° C. and held for 15 minutes. Next, 333 grams of isophorone diisocyanate was charged into the flask over 10 minutes, and mixed for 15 minutes. After mixing, 40 grams of MEK and 1.5 grams of dibutyl tin dilaurate (DBTDL) was charged into the flask and immediate exotherm was observed. After exotherm subsided, the mixture was heated to 90° C. and held for 60 minutes. The NCO equivalent weight was measured to be 899. The resulting mixture was kept at 60° C. before being dispersed into water.

Part B: An aqueous dispersion of hydrazide functional polyurethanes was prepared by charging the following components into a four necked round bottom flask fitted with a thermocouple, mechanical stirrer, and condenser at room temperature: 2200 grams of deionized water, 47 grams of dimethyl ethanolamine, and 150 grams of adipic acid dihydrazide. Next, 1100 grams of the isocyanate functional polyurethane made in Part A was dispersed into the flask over 20 minutes. The mixture was then heated up to 60° C. and mixed for an additional 30 minutes. Vacuum was applied to strip off 290 grams of MEK and water. After being cooled to 40° C., 1.0 gram of FOAMKILL® 649 (non-silicone defoamer, commercially available from Crucible Chemical Company), 13 grams of ACTICIDE® MBS (microbiocide formed of a mixture of 1,2-benzisothiazolin-3-one and 2-methyl-4-isothiazolin-3-one, commercially available from Thor GmbH), and 30 grams of deionized water were charged and mixed for an additional 15 minutes. The resulting dispersion was filtered via a 10 μm bag. The final dispersion had a non-volatile content of 34.7%.

Example 5

Preparation of a Hydrazide Functional Polyurethane-Acrylic Dispersion

Part A: An isocyanate functional polyurethane was first prepared by charging the following components into a four necked round bottom flask fitted with a thermocouple, mechanical stirrer, and condenser: 313 grams of methylethyl ketone (MEK), 746.6 grams of FOMREZ® 66-56 (hydroxyl terminated saturated linear polyester polyol, commercially available from Chemtura), 112 grams of dimethylol propionic acid (DMPA), and 5.4 grams of triethylamine. The mixture was heated to 50° C. and held for 15 minutes. Next, 500 grams of isophorone diisocyanate was charged into the flask over 10 minutes, and mixed for 15 minutes. After mixing, 45 grams of MEK and 2.25 grams of dibutyl tin dilaurate (DBTDL) was charged into the flask and immediate exotherm was observed. After exotherm subsided, the mixture was heated to 90° C. and held for 60 minutes. The NCO equivalent weight was measured to be 940. The resulting mixture was kept at 60° C. before being dispersed into water.

Part B: An aqueous dispersion of hydrazide functional polyurethanes was prepared by charging the following components into a four necked round bottom flask fitted with a thermocouple, mechanical stirrer, and condenser at room temperature: 1800 grams of deionized water, 70.5 grams of dimethyl ethanolamine, and 110 grams of 35% hydrazine. Next, 1650 grams of the isocyanate functional polyurethane made in Part A was dispersed into the flask over 20 minutes. The mixture was then heated up to 60° C. and mixed for an additional 30 minutes. Vacuum was applied to strip off 500 grams of MEK and water. After being cooled to 40° C., 0.3 grams of FOAMKILL® 649 (non-silicone defoamer, commercially available from Crucible Chemical Company), 6 grams of ACTICIDE® MBS (microbiocide formed of a mixture of 1,2-benzisothiazolin-3-one and 2-methyl-4-isothiazolin-3-one, commercially available from Thor GmbH), and 45 grams of deionized water were charged and mixed for an additional 15 minutes. The resulting dispersion was filtered via a 10 μm filter bag. The final dispersion had a solids content of 41.2%.

Example 6

Preparation of an Epoxy Functional Polyester

An epoxy functional polyester was prepared from the components listed in Table 4.

TABLE 4

| Component | Amount (grams) |
|---|---|
| Charge A | |
| MHHPA [3] | 948 |
| EPON ™ 828 [4] | 4054.7 |
| Charge B | |
| Capa ™ 2077A [5] | 2064.0 |
| Charge C | |
| EPON ™ 828 [4] | 395.9 |
| Triphenylphosphine | 46.4 |

[3] MHHPA is methylhexahydrophthalic anhydride, commercially available from Dixie Chemical.
[4] Difunctional bisphenol A/epichlorohydrin derived liquid epoxy resin, commercially available from HEXION SPECIALTY CHEMICALS.
[5] Polycaprolactone polyester diol, commercially available from Perstorp.

Charge A was added to a 12-liter, 4-necked kettle equipped with a motor driven stainless steel stir blade, a water-cooled condenser, a nitrogen blanket, and a heating mantle with a thermometer connected through a temperature feedback control device. The contents of the flask were heated to 90° C. and held for 30 minutes. Charge B was added and the reaction mixture was held at 90° C. for 30 minutes. Charge C was then added and the mixture was heated to 120° C. after exotherm. Then, the reaction mixture was held at 120° C. until the acid value was less than 2 mg KOH/g as determined with a Metrohm 798 MPT Titrino automatic titrator according to ASTM D 4662-15 and ASTM E 1899-16.

The reaction temperature was next cooled to 80° C. and the resin was poured out from the flask. The epoxy equivalent of the resulting epoxy functional polyester was 424 g/eq, and the weight average molecular weight by was 3670 g/mol.

Example 7

Preparation of an Epoxy Functional Polyester

An epoxy functional polyester was prepared from the components listed in Table 5.

TABLE 5

| Component | Amount (grams) |
|---|---|
| Charge A | |
| MHHPA [3] | 1038.6 |
| EPON™ 828 [4] | 4439.3 |
| Charge B | |
| Capa™ 4101 [6] | 1589.1 |
| Charge C | |
| EPON™ 828 [4] | 433.5 |
| Triphenylphosphine | 43.6 |

[6] Tetra-functional polyol terminated with primary hydroxyl groups, commercially available from Perstorp.

Charge A was added to a 12-liter, 4-necked kettle equipped with a motor driven stainless steel stir blade, a water-cooled condenser, a nitrogen blanket, and a heating mantle with a thermometer connected through a temperature feedback control device. The contents of the flask were heated to 90° C. and held for 30 minutes. Charge B was added and the reaction mixture was held at 90° C. for 30 minutes. Charge C was then added and the mixture was heated to 120° C. after exotherm. Then, the reaction mixture was held at 120° C. until the acid value was less than 2 mg KOH/g as determined by titration. The reaction temperature was cooled to 80° C. and the resin was poured out from the flask. The epoxy equivalent of the resulting epoxy functional polyester was 412 g/eq, and the weight average molecular weight was 18741 g/mol.

Example 8

Preparation of an Adhesion Promoter Blend

An adhesion promoter blend was prepared from the components listed in Table 6.

TABLE 6

| Component | Amount (grams) | Equivalent Weight (g/eq) | Epoxy Equivalence | Thiol Equivalence |
|---|---|---|---|---|
| Kane Ace MX-153 [7] | 26.5 | 270 | 0.098 | 0.0 |
| Resin of Example [6] | 4.2 | 423 | 0.010 | 0.0 |
| Resin of Example [7] | 4.9 | 410 | 0.012 | 0.0 |
| THIOCURE® PETMP [8] | 13.8 | 127 | 0.0 | 0.109 |

[7] A core-shell poly(butadiene) rubber dispersion (33% rubber by weight) in unmodified liquid epoxy resin based on bisphenol-A, commercially available from Kaneka Texas Corporation.
[8] Pentaerythritol tetra(3-mercaptopropionate), commercially available from BRUNO BOCK Chemische Fabrik GmbH & Co. KG.

The adhesion promoter blend was prepared by combining the components listed in Table 6 in an appropriate sized container and mixing the components for the appropriate period of time.

Examples 9-10

Preparation and Evaluation of Coating Compositions

Coating compositions were prepared with the materials previously described as shown in Table 7.

TABLE 7

| Example | PUD[9] | Hydrazide[10] | Polyester[11] | Adhesion Blend[2] | Polythioether[13] |
|---|---|---|---|---|---|
| Comparative Example 9 | 87.3 g | 5.6 g | 7.1 g | 3 g | 0 g |
| Example 10 | 75.9 g | 5.6 g | 7.1 g | 3 g | 5 g |

[9] The polyurethane-acrylic dispersion prepared in Example 2.
[10] The hydrazide functional polyurethane-acrylic dispersion prepared in Example 5.
[11] The polyester prepared in Example 3.
[12] The adhesion promoter blend prepared in Example 8.
[13] The polythioether prepared in accordance with Example 1 from U.S. Pat. No. 5,912,319, which is incorporated by reference herein.

The coating compositions of examples 9-10 were prepared by combining the components listed in Table 7 along with 3.8 g of CARBODILITE® V-02-L2 (waterborne carbodiimide crosslinker, commercially available from Nisshinbo Chemical, Inc.), 2.5 g of carbon black, and 2.1 g of CYMEL® 385 (a waterborne methylated high imino melamine resin, commercially available from Allnex) in an appropriate sized container for 15 minutes. Each mixture was then allowed to stand (equilibrate) overnight (about 12 to 16 hours) to form a coating composition.

After preparing the coating compositions, free coating films were prepared by weighing 2.5 grams of each composition into an aluminum or silicone pan. The compositions were flashed overnight at ambient conditions, dehydrated for 10 minutes at 49° C., and then cured for 30 minutes at 82° C.

The storage modulus of each free coating film at −40° C. was determined by dynamic mechanical analysis using a model QA800 Dynamic Mechanical Analysis made by TA Instruments (New Castle, Del.) using the following parameters: mode: tension film, strain: 1%, frequency: 1 Hz, clamping force: 20 cNm, temperature cycle: −70° C. to 175° C., heating rate: 3° C./min., sample dimensions: 10.0 length×~6.5 width (mm). The free coating films were also tested for oxygen permeance with an OX-TRAN® 1/50 test system (commercially available from Mocon Inc.) at 23° C. and 50% relative humidity in accordance with ASTM method F1927-14. The results of the testing are shown in Table 8.

TABLE 8

| Composition to form coating film | Permeance (cc · mm/m$^2$ · day · atm) | Storage modulus (MPa) |
|---|---|---|
| Comparative Example 9 | 9 | 2749 |
| Example 10 | 13 | 2346 |

As shown in Table 8, the free coating films of Examples 9-10 both exhibited good oxygen permeance, while the free coating film of Example 10 exhibited better storage modulus as compared to Comparative Example 9 which was formed from a composition that did not include a polythioether.

In view of the foregoing, the present invention is directed to the following non-limiting clauses:

Clause 1: A coating composition comprising: (a) core-shell particles comprising a polymeric core at least partially encapsulated by a polymeric shell, wherein the polymeric shell comprises: (i) a barrier segment comprising aromatic groups and urethane linkages, urea linkages, or a combination thereof; and (ii) an elastomeric segment that is different from (i), and wherein the polymeric shell is covalently bonded to at least a portion of the polymeric core; (b) a polythioether comprising thioether linkages and mercapto functional groups; and (c) an adhesion promoter comprising at least one polymer that is different from (a) and (b).

Clause 2: The coating composition of clause 1, wherein the polythioether comprises at least 2 mercapto groups per polymer chain.

Clause 3: The coating composition of clauses 1 or 2, wherein the polythioether comprises a weight average molecular weight of at least 3,000 g/mol.

Clause 4: The coating composition of any one of clauses 1-3, wherein the polythioether further comprises ether linkages.

Clause 5: The coating composition of any one of clauses 1-4, wherein at least a portion of the polymeric core of the core-shell particles comprises an addition polymer formed from (meth)acrylic monomers, vinyl monomers, or combinations thereof.

Clause 6: The coating composition of any one of clauses 1-5, wherein the barrier segment comprises at least 30 weight % of the polymeric shell based on the total solids weight of the polymeric shell.

Clause 7: The coating composition of any one of clauses 1-6, wherein the adhesion promoter comprises: (a) at least one epoxy functional polymer and a thiol functional crosslinker reactive with the epoxy functional polymer; and/or (b) a hydrazide functional component.

Clause 8: The coating composition of clause 7, wherein the adhesion promoter comprises the at least one epoxy functional polymer and thiol functional crosslinker.

Clause 9: The coating composition of any one of clauses 7 or 8, wherein the adhesion promoter comprises: (1) a polymer comprising aromatic groups, hydroxyl groups, and two or more epoxy groups per molecule; (2) an epoxy functional polymer mixed with core-shell rubber particles; or a combination thereof.

Clause 10: The coating composition of any one of clauses 7-9, wherein the adhesion promoter comprises at least two of the following: (1) a polymer comprising aromatic groups, hydroxyl groups, and two epoxy groups per molecule; (2) a polymer comprising aromatic groups, hydroxyl groups, and greater than two epoxy groups per molecule; and (3) an epoxy functional polymer mixed with core-shell rubber particles.

Clause 11: The coating composition of any one of clauses 7-10, wherein the adhesion promoter comprises the hydrazide functional component.

Clause 12: The coating composition of clause 11, wherein the hydrazide functional component comprises a polymeric material comprising two or more hydrazide functional groups per molecule.

Clause 13: The coating composition of clause 12, wherein the polymeric material having hydrazide functionality is comprised of core-shell particles present in the coating composition, the core-shell particles comprising (1) a polymeric core at least partially encapsulated by (2) a polymeric shell comprising hydrazide functional groups, wherein the polymeric core is covalently bonded to at least a portion of the polymeric shell.

Clause 14: The coating composition of any one of clauses 7-13, wherein the adhesion promoter comprises both (a) the at least one epoxy functional polymer and thiol functional crosslinker and (b) the hydrazide functional component.

Clause 15: The coating composition of any one of clauses 1-14, wherein, when the coating composition is cured to form a coating, the coating has an elongation at break of at least 25% at −40° C. as determined by the elongation at break test.

Clause 16: A substrate at least partially coated with a coating formed from the coating composition of any one of clauses 1-15.

Clause 17: The substrate of clause 16, wherein the substrate comprises a tire.

Whereas particular embodiments of this invention have been described above for purposes of illustration, it will be evident to those skilled in the art that numerous variations of the details of the present invention may be made without departing from the invention as defined in the appended claims.

The invention claimed is:

1. A coating composition comprising:
(a) core-shell particles comprising a polymeric core at least partially encapsulated by a polymeric shell, wherein the polymeric shell comprises: (i) a barrier segment comprising aromatic groups; and urethane linkages, urea linkages, or a combination thereof; and (ii) an elastomeric segment that is different from (i), and wherein the polymeric shell is covalently bonded to at least a portion of the polymeric core;
(b) a polythioether polymer comprising thioether linkages and mercapto functional groups; and
(c) an adhesion promoter comprising at least one component that is different from (a) and (b).

2. The coating composition of claim 1, wherein the polythioether polymer of (b) comprises at least 2 mercapto functional groups per polymer chain.

3. The coating composition of claim 1, wherein the polythioether polymer of (b) has a weight average molecular weight of at least 3,000 g/mol.

4. The coating composition of claim 1, wherein the polythioether polymer of (b) further comprises ether linkages.

5. The coating composition of claim 1, wherein at least a portion of the polymeric core of the core-shell particles of (a) comprises an addition polymer formed from (meth)acrylic monomers, vinyl monomers, or combinations thereof.

6. The coating composition of claim 1, wherein the barrier segment comprises at least 30 weight % of the polymeric shell of (a) based on the total solids weight of the polymeric shell.

7. The coating composition of claim 1, wherein said at least one component of the adhesion promoter of (c) comprises: at least one epoxy functional polymer and a thiol functional crosslinker reactive with the epoxy functional polymer, and/or a hydrazide functional component.

8. The coating composition of claim 7, wherein said at least one component of the adhesion promoter of (c) comprises the at least one epoxy functional polymer and thiol functional crosslinker.

9. The coating composition of claim 7, wherein the at least one epoxy functional polymer of the adhesion promoter of (c) comprises: (1) a polymer comprising aromatic groups, hydroxyl groups, and two or more epoxy groups per molecule; (2) an epoxy functional polymer mixed with core-shell rubber particles; or a combination of (1) and (2).

10. The coating composition of claim 7, wherein the at least one epoxy functional polymer of the adhesion promoter of (c) comprises at least two of the following: (1) a polymer comprising aromatic groups, hydroxyl groups, and two epoxy groups per molecule; (2) a polymer comprising aromatic groups, hydroxyl groups, and greater than two epoxy groups per molecule; and (3) an epoxy functional polymer mixed with core-shell rubber particles.

11. The coating composition of claim 7, wherein said at least one component of the adhesion promoter of (c) comprises the hydrazide functional component.

12. The coating composition of claim 11, wherein the hydrazide functional component comprises a polymeric material comprising two or more hydrazide functional groups per molecule.

13. The coating composition of claim 12, wherein the polymeric material having hydrazide functionality is comprised of core-shell particles, the core-shell particles comprising (1) a polymeric core at least partially encapsulated by (2) a polymeric shell comprising hydrazide functional groups, wherein the polymeric core is covalently bonded to at least a portion of the polymeric shell.

14. The coating composition of claim 7, wherein the adhesion promoter of (c) comprises both the at least one epoxy functional polymer and thiol functional crosslinker, and the hydrazide functional component.

15. The coating composition of claim 1, wherein, when the coating composition is cured to form a coating, the coating has an elongation at break of at least 25% at −40° C. as determined by the elongation at break test.

16. A substrate at least partially coated with a coating formed from the coating composition of claim 1.

17. The substrate of claim 16, wherein the substrate is a tire.

* * * * *